US 9,804,888 B2

(12) United States Patent
Marathe et al.

(10) Patent No.: US 9,804,888 B2
(45) Date of Patent: Oct. 31, 2017

(54) SYSTEM AND METHOD FOR IMPLEMENTING CONSTRAINED DATA-DRIVEN PARALLELISM

(71) Applicant: Oracle International Corporation, Redwood City, CA (US)

(72) Inventors: Virendra J. Marathe, Florence, MA (US); Yosef Lev, New York, NY (US); Victor M. Luchangco, Cambridge, MA (US)

(73) Assignee: Oracle International Corporation, Redwood City, CA (US)

( * ) Notice: Subject to any disclaimer, the term of this patent is extended or adjusted under 35 U.S.C. 154(b) by 134 days.

(21) Appl. No.: 14/047,749

(22) Filed: Oct. 7, 2013

(65) Prior Publication Data
US 2014/0282574 A1    Sep. 18, 2014

Related U.S. Application Data

(60) Provisional application No. 61/794,321, filed on Mar. 15, 2013.

(51) Int. Cl.
G06F 9/48 (2006.01)

(52) U.S. Cl.
CPC .................... *G06F 9/4881* (2013.01)

(58) Field of Classification Search
None
See application file for complete search history.

(56) References Cited

U.S. PATENT DOCUMENTS

| 5,557,747 | A * | 9/1996 | Rogers ............ H04L 41/16 709/223 |
|---|---|---|---|
| 8,719,415 | B1 * | 5/2014 | Sirota et al. ............ 709/226 |
| 2004/0095352 | A1 * | 5/2004 | Huang ..................... 345/473 |
| 2005/0245245 | A1 * | 11/2005 | Sorvari et al. ........... 455/418 |
| 2007/0136264 | A1 * | 6/2007 | Tran ......................... 707/4 |
| 2010/0131955 | A1 * | 5/2010 | Brent et al. ............. 718/103 |

(Continued)

OTHER PUBLICATIONS

Imam et al. Integrating Task Parallelism with Actors. [online] (Oct. 26, 2012). ACM., pp. 1-19. Retrieved from the Internet <http://shams.web.rice.edu/papers/2012-oopsla-actors.pdf>.*

(Continued)

*Primary Examiner* — Emerson Puente
*Assistant Examiner* — Jonathan R Labud
(74) *Attorney, Agent, or Firm* — Robert C. Kowert; Meyertons, Hood, Kivlin, Kowert & Goetzel, P.C.

(57) ABSTRACT

Systems and methods for implementing constrained data-driven parallelism may provide programmers with mechanisms for controlling the execution order and/or interleaving of tasks spawned during execution. For example, a programmer may define a task group that includes a single task, and the single task may define a direct or indirect trigger that causes another task to be spawned (e.g., in response to a modification of data specified in the trigger). Tasks spawned by a given task may be added to the same task group as the given task. A deferred keyword may control whether a spawned task is to be executed in the current execution phase or its execution is to be deferred to a subsequent execution phase for the task group. Execution of all tasks executing in the current execution phase may need to be complete before the execution of tasks in the next phase can begin.

17 Claims, 9 Drawing Sheets

(56) References Cited

U.S. PATENT DOCUMENTS

2010/0322237 A1* 12/2010 Raja et al. .................. 370/389
2012/0246662 A1* 9/2012 Vechev et al. ............... 718/107

OTHER PUBLICATIONS

D. Chase and Y. Lev. Dynamic circular work-stealing deque. In Proceedings of the 17th Annual ACM Symposium on Parallelism in Algorithms and Architectures, pp. 21-28, 2005.

Arvind and D. E. Culler. Dataflow Architectures. Annual review of computer science, 1:225-253, 1986.

K. Asanovic, R. Bodik, B. C. Catanzaro, J. J. Gebis, P. Husbands, K. Keutzer, D. A. Patterson, W. L. Plishker, J. Shalf, S. W. Williams, and K. A. Yelick. The landscape of parallel computing research: A view from berkeley. Technical Report UCB/EECS-2006-183, EECS Department, University of California, Berkeley, pp. 1-56, Dec. 2006.

F. Ellen, Y. Lev, V. Luchangco, and M. Moir. SNZI: Scalable NonZero Indicators. In Proceedings of the 26th Annual ACM symposium on Principles of Distributed Computing, pp. 13-22, 2007.

V. Gajinov, S. Stipic, O. S. Unsal, T. Harris, E. Ayguade, and A. Cristal. Integrating dataflow abstractions into the shared memory model. In Proc. 2012 IEEE 24th International Symposium on Computer Architecture and High Performance Computing, SBAC-PAD '12, pp. 243-251, 2012.

M. A. Hammer, U. A. Acar, and Y. Chen. Ceal: a c-based language for self-adjusting computation. In Proceedings of the 2009 ACM SIGPLAN conference on Programming language design and implementation, pp. 25-37, 2009.

S. Hong, H. Chafi, E. Sedlar, and K. Olukotun. Greenmarl: a dsl for easy and efficient graph analysis. In Proceedings of the 17th international conference on Architectural Support for Programming Languages and Operating Systems, pp. 349-362, 2012.

M. Isard and A. Birrell. Automatic mutual exclusion. In HotOS '07: Proc. 11th Workshop on Hot Topics in Operating Systems, Berkeley, CA. pp. 1-6, May 2007.

M. Kulkarni, M. Burtscher, C. Cascaval, and K. Pingali. Lonestar: A suite of parallel irregular programs. In IEEE International Symposium on Performance Analysis of Systems and Software, pp. 65-76, 2009.

M. Kulkarni, P. Carribault, K. Pingali, G. Ramanarayanan, B. Walter, K. Bala, and L. P. Chew. Scheduling strategies for optimistic parallel execution of irregular programs. In Proceedings of the twentieth annual symposium on Parallelism in algorithms and architectures, pp. 217-228, 2008.

K. Madduri, D. Ediger, K. Jiang, D. A. Bader, and D. Chavarria-Miranda. A faster parallel algorithm and effcient multithreaded implementations for evaluating betweenness centrality on massive datasets. In Proceedings of the 2009 IEEE International Symposium on Parallel & Distributed Processing, pp. 1-8, 2009.

D. Peng and F. Dabek. Large-scale incremental processing using distributed transactions and notifications. In Proceedings of the 9th USENIX conference on Operating systems design and implementation, pp. 1-15, 2010.

U. N. Raghavan, R. Albert, and S. Kumara. Near linear time algorithm to detect community structures in largescale networks. Physics Review E, 76, pp. 1-12, 2007.

D. Sanchez, R. M. Yoo, and C. Kozyrakis. Flexible architectural support for fine-grain scheduling. In Proceedings of the fifteenth edition of ASPLOS on Architectural support for programming languages and operating systems, pp. 311-322, 2010.

C. Seaton, D. Goodman, M. Lujn, and I. Watson. Applying dataflow and transactions to Lee routing. In Proc. 5th Workhop on Programmability Issues for Heterogeneous Multicores (MULTIPROG), pp. 1-13, 2012.

S. Tasirlar and V. Sarkar. Data-driven tasks and their implementation. In Proceedings of the 2011 International Conference on Parallel Processing, pp. 652-661, 2011.

H.-W. Tseng and D. M. Tullsen. Data-triggered threads: Eliminating redundant computation. In Proceedings of the 2011 IEEE 17th International Symposium on High Performance Computer Architecture, pp. 181-192, 2011.

H.-W. Tseng and D. M. Tullsen. Software data-triggered threads. In Proceedings of the ACM international conference on Object oriented programming systems languages and applications, pp. 703-716, 2012.

L. G. Valiant. A bridging model for parallel computation. Communications of the ACM, 33(8):103-111, Aug. 1990.

J. Planas, R. M. Badia, E. Ayguad'e, and J. Labarta. Hierarchical task-based programming with starss. Int. J. High Perform. Comput. Appl., 23(3):284-299, Aug. 2009.

* cited by examiner

SYSTEM AND METHOD FOR IMPLEMENTING CONSTRAINED DATA-DRIVEN PARALLELISM

This application claims benefit of priority of U.S. Provisional Application Ser. No. 61/794,321 entitled "System and Method for Implementing Constrained Data-Driven Parallelism," filed Mar. 15, 2013, the content of which is incorporated by reference herein in its entirety.

BACKGROUND

Field of the Disclosure

This disclosure relates generally to parallel programming, and more particularly to systems and methods for implementing constrained data-driven parallelism.

Description of the Related Art

The ongoing proliferation of multicore systems in the mainstream computing industry is making parallel programming more commonplace. However, experience over several decades has shown that parallel programming is difficult. Thus far, it has been restricted to an elite group of programming experts.

A particularly thorny issue encountered in parallel programming is the issue of how to implement efficient and correct data sharing between concurrent computations. The traditional lock based mutual exclusion approach is highly cumbersome and error prone. One particularly promising alternative programming abstraction is the atomic block, in which the programmer delineates a block of code as atomic, thus guaranteeing that the code in the block is executed atomically and in isolation from other concurrently executing computations. With this approach, the programmer needs to specify what code needs to execute atomically, and the system transparently guarantees its atomicity. This approach is in stark contrast with the traditional model of lock based mutual exclusion in which the programmer has to map shared objects to locks, manually ensure that the right set of locks are acquired while accessing these objects, and manually release the locks when the object accesses are completed. With this approach, the programmer must also carefully avoid any lock acquisition ordering that may lead to deadlocks. Atomic blocks are very useful tools that relieve the programmer from the headache of explicitly managing synchronization in the parallel application. However, atomic blocks do not help express parallelism in applications, which is another challenge that programmers face.

Exploiting multicore systems requires parallel computation, preferably with minimal synchronization. Another promising approach is data-driven parallelism, in which a computation is broken into tasks, each of which is triggered to run when some (specified) data is modified. These tasks may modify additional data, thereby triggering additional tasks. Thus, changes to data "drive" the parallel computation. In other words, in data-driven parallelism, changes to data spawn new tasks, which may change more data, spawning yet more tasks. With this approach, the computation propagates until no further changes occur. The benefits of this approach can include increasing opportunities for fine-grained parallelism, avoiding redundant work, and supporting incremental computations on large data sets. Nonetheless, data-driven parallelism can be problematic. For example, the convergence times of data-driven single-source shortest paths algorithms can vary by two or more orders of magnitude depending on task execution order.

SUMMARY

The system and methods described herein may in some embodiments be used to implement constrained data-driven parallelism, in which programmers can impose ordering constraints on tasks. For example, in some embodiments, executing a given task in a data-driven computation may result in spawning one or more other tasks (e.g., spawning a task that corresponds to an iteration of a loop construct in program code or spawning a task in response to a trigger condition for the data-driven computation being met). In some embodiments, for each of the spawned tasks, the system may be configured to determine whether to schedule the spawned task for execution (e.g., in a current execution phase) or to defer execution of the spawned task (e.g., to a subsequent execution phase). For example, a subset of the spawned tasks (e.g., zero or more of the spawned tasks) may be scheduled for execution while execution of another subset of the spawned tasks (e.g., zero or more of the spawned tasks) may be deferred. In some embodiments, none of the spawned tasks for which execution was deferred can be executed until after all of the spawned tasks that were scheduled for execution (if any) have completed execution.

In some embodiments, determining whether to schedule a spawned task for execution or to defer its execution may be dependent on whether program instructions defining the spawned task specify that the spawned task should be deferred. In other embodiments, determining whether to schedule a spawned task for execution or to defer its execution may be dependent on a system-wide, application-specific, task-specific, or user-specified policy or parameter value. In some embodiments, determining whether to schedule a spawned task for execution in a current execution phase or to defer its execution may be dependent on the relative priorities of the spawned tasks. For example, all of the tasks in the subset of spawned tasks that are scheduled for execution in the current phase may have higher priorities than any of the tasks in the subset of spawned tasks for which execution is deferred.

In some embodiments, each of the spawned tasks may be added to a task group that includes the task that spawned it. For example, a task group may include a given task, a subset of tasks spawned by the given task that are scheduled for execution in the current execution phase, and a subset of tasks spawned by the given task for which execution is deferred to a subsequent execution phase. In some embodiments, two or more of the spawned tasks for which execution was deferred may be deferred to (and subsequently executed within) different ones of multiple subsequent execution phases for the task group. For example, one or more tasks may be deferred to the phase immediately succeeding the current execution phase, while one or more other tasks may be deferred to a phase that follows the phase immediately succeeding the current execution phase.

In some embodiments, the techniques for implementing constrained data-driven parallelism described herein may be dependent, at least in part, on the relative priorities of various task groups. For example, in some embodiments, once execution of all of the tasks that were added to a task group has been completed (but not before), the system may begin execution of one or more tasks in another task group (e.g., a task group in which the tasks have a lower priority than the tasks in the first task group). In some embodiments, when a task group is created, its creation may include executing an operation that blocks execution of tasks in any other task groups until execution of all tasks that are subsequently added to the task group has been completed. In such embodiments, once execution of all of the tasks that were added to a task group has been completed (but not before), the system may begin execution of one or more tasks in another task group (e.g., one that was created subsequent to the execution of the blocking operation).

In some embodiments, determining whether execution of the tasks in a task group, in a subset of spawned tasks that were scheduled for execution during a current execution phase, or in a subset of spawned tasks for which execution has been deferred has been completed may be dependent on a value of a respective nonzero indicator that is associated with the task group or the subset of spawned tasks. For example, the value of the nonzero indicator may indicate whether the number of tasks in the task group or the subset of spawned tasks that have not completed execution is zero or nonzero (e.g., without indicating the exact number of tasks that have not completed execution).

In some embodiments, each of the spawned tasks may be placed in a pool of tasks (e.g., a pool of tasks that are to be executed in the current phase or a pool of tasks for which execution is deferred). In some embodiments, the spawned tasks may be picked up from the pool in which they were placed and executed by the threads that placed them in the pools or by one or more other threads (e.g., according to a work-stealing policy). In embodiments in which the asynchronous execution of one or more handlers is triggered by accessing corresponding objects that have been defined as atomic triggers, the triggered handlers may be executed by the runtime system.

Figure 1:
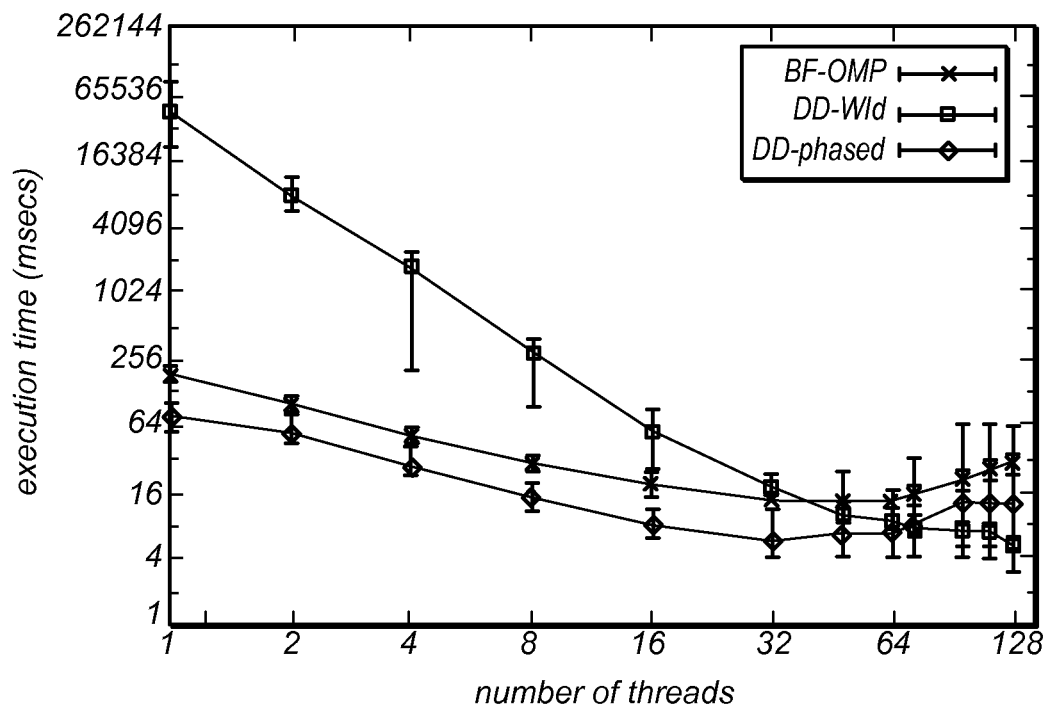
FIG. 1 is a graph illustrating the time it takes to compute an SSSP solution using different algorithms, according to various embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION OF EMBODIMENTS

The system and methods described herein may in some embodiments be used to implement constrained data-driven parallelism, in which programmers can impose ordering constraints on tasks. In particular, new abstractions may be used to define groups of tasks and to constrain the execution order of tasks within each group. For example, as illustrated in many of the examples herein, the execution order of tasks within each task group may be constrained by designating tasks for execution in different execution phases. In other embodiments, other mechanisms may be provided for controlling the execution order and/or interleaving of tasks within the same task group and/or in different task groups (including, but not limited to, task queues of different types, such as LIFOs, FIFOs, or deques). Several example embodiments are described herein. Preliminary performance results (presented below) suggest that this approach may enable new efficient data-driven implementations of a variety of graph algorithms. The techniques described herein for implementing constrained data-driven parallelism may be applied in applications in which correctness of a data-driven computation is dependent on the particular order in which spawned tasks are executed and/or in applications in which correctness is not dependent on the particular order in which spawned tasks are executed.

Some applications exhibit the property of being "naturally" data-driven. For example, the execution of such applications can be partitioned into smaller computational chunks that are always triggered by reads or (perhaps more typically) writes to certain privileged objects. In some such applications, some or all of these computational chunks can be concurrently scheduled for execution. However, in some applications these chunks can have non-trivially overlapping shared memory accesses, such that a synchronization mechanism is necessary to avoid data races between concurrently executing chunks. Note that (at least partial) ordering of the execution of the computation chunks in the application may be implicitly achieved by the order in which the corresponding privileged objects are accessed.

As an example, consider role playing multiplayer games (RPMG), in which each player controls a single persona on a quest to achieve certain objectives. While navigating through the game environment, a player's persona may encounter game-engine-controlled personalities and objects and/or other player-controlled personalities. In some cases, there may be a wide array of interactions that can happen between personalities that "meet" in the game (e.g., the personalities may fight, flee, ignore each other, collaborate with each other, etc.). Typically, each persona has a radius of visibility within which the persona can perceive all of the objects and other personalities. The persona should be able identify all changes within its radius of visibility almost instantaneously. This may include identifying new objects or personalities that become visible and/or identifying old objects or personalities that are no longer visible (either because the persona moves or because the other objects or personalities move). In addition, each persona should be able to react to the changes in its environment.

The RPMG is observed to be an event-driven computation, in which the changes in a persona's environment immediately trigger a reaction from the persona. If the persona is controlled by a player, it becomes the player's responsibility to react to the changing environment. However, if the persona is controlled by the game engine, then the game engine must automatically detect the change in the persona's environment and act according to certain predetermined or learned rules. This interaction can be viewed as a data-driven computation, since the events of change in the persona's environment manifest as modifications to the game space (e.g., the Euclidean space of the game environment) in the persona's radius of visibility. The game space is typically partitioned into blocks of space. In some cases, the space blocks may be the privileged objects that, when updated, trigger one or more computational activities, e.g., computations that update the graphical display of the players affected and/or computations whose results represent reactions of the engine-controlled personalities that "observe" the privileged updates, etc.

In addition to the data-driven nature of interactions between different personalities and objects, many of the operations and events in the game environment may need to be atomic. For instance, when a persona moves from one space block to another, the blocks in its radius of visibility also change. Manifesting such a change may involve modifying the state of each of the affected blocks, and all these changes may need to appear to be atomic. Previous work on parallelizing RPMGs has demonstrated that the use of atomic blocks (which were implemented as memory transactions in some cases) may significantly simplify the programming complexity, and may even improve the game's performance over previous lock-based implementations. Thus, it has been observed that RPMG applications may benefit from the use of atomic blocks combined with a data-driven programming approach.

Another example of a data-driven computation is Conway's Life. In this iterative application (which simulates an evolutionary process over multiple iterations/generations), some cells in a grid of cells are designated as "active" and others are designated as "inactive". Each cell stores a value representing the number of its neighbor cells (e.g., its immediate neighbors in the horizontal, vertical, and diagonal directions) that are active. At each iteration, all of the cells are processed, and a new set of active cells is generated, based on which cells are currently active. For example, an inactive cell whose value was increased to a value of 3 (because it now has three active neighbors) becomes active itself, and this change will affect the set of active/inactive cells in the next iteration. An active cell whose value has dropped to 0 or 1, or whose value has reached a value of 4 or more will become inactive, and this change will affect the set of active/inactive cells in the next iteration. In this application, many cells do not change from one generation to the next. Subject to ordering between the generations, the "interesting" cells (e.g., those that have changed or will change because they are neighbors of those that recently changed) may be processed in parallel. The techniques described herein may be suitable for application to these and other naturally data-driven computations and may, in some embodiments, reduce the amount of work performed in executing them and/or otherwise result in performance improvements when compared to previous techniques.

In some embodiments, a programming model for implementing constrained data-driven parallelism (sometimes referred to herein as an ATriggers Programming Model) may include:

An application data structure

Handler functions attached to data (which may typically be defined per-data type)

A distributed pool of tasks (triggers that have been fired or corresponding trigger handlers that have been invoked in response to their trigger conditions having been met, e.g., in response to specified data having been modified)

In some embodiments that employ constrained data-driven parallelism, the following operations may be performed:

1. A worker thread may pick a task from a pool of tasks.
2. The task (and, in some cases, one or more other tasks) may execute, updating shared data.
3. New tasks (e.g., tasks generated as a result of updating the shared data) may be placed in a pool to be executed in the current phase or in a pool to be executed in a subsequent phase (the next phase, or any of n subsequent phases, where n≥1, according to their relative priorities).
4. Execution may move to the next phase once the pool of tasks to be executed in the current phase is empty.

Applications that are well-suited for the use of constrained data-driven parallelism (e.g., for the use of atomic triggers, also referred to herein as "atriggers", or any of the other techniques usable in implementing constrained data-driven parallelism, as described herein) may exhibit some or all of the following characteristics (e.g., a well-suited application may be found at intersection(s) of these three characteristics):

Data-driven computation: Updates to one piece of data trigger changes to one or more neighboring pieces Irregular access patterns: Data-dependent access patterns make concurrency control difficult (e.g., the compiler cannot determine them statically at compile time; instead, the access patterns are determined dynamically, during execution)

Abundant parallel work: There are many potential pieces of work to process in parallel at any given time As previously noted, with data-driven parallelism, a computation may be broken up into tasks, each of which may be triggered to run when some (specified) data is modified. These tasks may modify additional data, thereby triggering additional tasks. Thus, changes to data "drive" the parallel computation. Consider, for example, the single-source shortest paths (SSSP) problem: given a weighted graph with no negative-weight cycles, compute the length of the shortest paths to each node from a single source node. An SSSP problem may be solved by first assigning the source a distance estimate of 0 and every other node a distance estimate of 1, and then performing relaxation steps on the graph's edges until no more are possible. Each relaxation step may consider an edge from x to y, and whether going to x and then following this edge provides a shorter path to the source than the current distance estimate from the source to y.

An SSSP computation is well-suited for parallelism because the relaxation steps can run in any order (without affecting correctness), and they only need to synchronize when their edges share a node. It may also be particularly well-suited to being data-driven because the relaxation steps are initially performed only on edges of the source node, and thereafter, only on edges of nodes whose distance estimates have been updated.

Different approaches to solving single-source shortest paths problems have been explored that involve the following:

Different design choices
"Pull" v "Push" approaches
Different synchronization mechanisms In one embodiment, a constrained data-driven approach to SSSP yielded a speedup over a previous sequential approach with 2-4 threads, which scaled to a 20× speedup with 60 threads on a large graph.

In general, relaxation-based algorithms for solving SSSP problems may implement the following:
  Find edges connecting nodes in which the current distance estimate to one of the nodes from the source (L2) is greater than the sum of the distance to a neighbor node from the source (L1) plus the length of the edge between the node and its neighbor (w). In other words, find edges connecting nodes in which L2>L1+w.
  Update L2 to L1+w.

In various earlier approaches, relaxation-based algorithms for solving SSSP problems may also implement one or more of the following:
  Keep nodes in a priority queue based on their distance to source.
  Repeatedly iterate over all nodes, stopping after a complete round with no changes.
  Keep track of which nodes were relaxed in the previous round, and skip relaxation through other nodes.

Data-driven algorithms for solving SSSP problems may implement the following:
  Each task relaxes the edges of a single node.
  The task determines whether there is any change. If so, it spawn tasks for the node's neighbors that were relaxed.
  The spawned tasks may be spawned for execution in the next phase to avoid exponential costs associated with unlucky scheduling.
  The algorithm may maintain a flag in each node to indicate whether or not it has spawned another task.

Design variants that have been explored for use in solving SSSP problems have included:
  Early propagation
    If used, it may allow a node to see preceding updates in the same round.
    If not used, a node may keep extra state and may only see updates from the preceding round.
  Ensuring atomicity
    Using software transactional memory (STM)
    Using compare-and-swap (CAS) type operations or per-node locking
  Exploiting parallelism
    Using parallel for loop constructs of the OpenMP® API
    Using an atriggers based work queue, as described in more detail below Although the SSSP computation is correct regardless of the order in which edges are relaxed, the order can have a profound impact on execution time. For example, the best order may require only one relaxation step per edge, while a bad order can induce an exponential number of additional relaxation steps. As FIG. 1 illustrates, this is not merely a theoretical problem.

FIG. 1 illustrates the time to compute an SSSP solution using constructs of the OpenMP API (BF-OMP) and various data-driven algorithms (DD-Wild, and DD-Phased). More specifically, FIG. 1 shows three variants of SSSP running on the ca-HepPh sparse matric graph from the Stanford Network Analysis Platform (SNAP). In this example, BF-OMP is a parallel version of the Bellman-Ford algorithm, in which the computation proceeds in rounds, and every edge is relaxed once per round using a parallel for loop of the OpenMP API. DD-Wild is a data-driven algorithm in which an edge is relaxed when it is incident on a node whose distance estimate has changed. This tends to produce a depth-first traversal of the graph, which is a bad order for computing SSSP. Thus, although it scales well, with one thread, DD-Wild is over 200 times slower than BF-OMP. As illustrated in FIG. 1, the DD-Phased algorithm, which is an implementation that uses one or more of the abstractions introduced herein to constrain task execution order, outperforms BF-OMP at every thread count.

In some embodiments, data-driven parallelism may benefit significantly from the ability to constrain the order in which tasks run. In some embodiments, choosing the appropriate constraints may be considered a property of an algorithm, and may be expressed in the source code (rather than by picking a plug-in scheduler for an application as a whole).

Programming Model

In some embodiments of the constrained data-driven approaches to parallelism described herein, a computation may be divided into tasks to be executed by threads. In such embodiments, each task may belong to a task group, which may execute in one or more phases. For example, a task may spawn a new task via a parallel for loop, or via a trigger that specifies data-driven computation, as in the following example:
  x triggers [deferred] f(void*d);
  *y triggers [deferred] g(void*d);

In this example, x may be considered a direct trigger for f and *y may be considered an indirect trigger for g. When such declarations are in effect, writing to x may spawn a task to run f, and modifying data by dereferencing y may spawn a task that runs g. In this example, each of the functions f and g takes a single argument, which is a pointer to the data that was modified. Declarations such as these may be sufficient for many different use cases, though additional arguments may be useful in other use cases and/or in other embodiments. As described below, the optional deferred keyword may be used to constrain the execution order of spawned tasks, in some embodiments.

In some embodiments, a task group, which may be declared as follows, may represent a set of tasks. In some such embodiments, every task may belong to exactly one task group.

```
taskgroup {
    // code
} t;
```

In this example, when this block is executed, a new task group t is created. Initially, the new task group may have a single task, i.e., running the code in the declared block (which may be executed by the thread that entered the block). In some embodiments, each newly spawned task may belong to the same task group as the task that spawned it.

In some embodiments, a task group may have only one method (e.g., a WaitForGroup method), and this method may block execution of the caller until every task in the corresponding task group has completed execution. Note that, in this example, deadlock cannot arise solely from calls to WaitForGroup because the name of a task group is not in scope in the code block and no mechanism is provided to pass task groups (e.g., there is no named type for task groups). In other embodiments, a task group may have multiple methods, one of which may be a WaitForGroup method.

In some embodiments, within a task group, tasks may be further partitioned into a totally ordered series of phases. In some such embodiments, a task may spawn a task either in the current phase, in the next phase (e.g., using the optional deferred keyword), or in a particular (e.g., specified) one of multiple subsequent phases, according to various system-wide, application-specific, task/trigger-specific, or user-specified policies or parameter values. For example, in some embodiments (e.g., in applications in which correctness is not dependent on the order in which tasks are executed), the highest priority tasks may be executed in the current phase, and tasks with lower priorities may be deferred to n different subsequent phases (where n≥1), dependent on their relative priorities. In some embodiments, no task is executed until all tasks in the previous phase(s) have completed executing. Thus, at any time, every task that has not completed is in either the current phase or a subsequent phase of its task group. In some embodiments, the programmer may also be able to control or constrain the order of execution for different task groups. In some such embodiments, subsequent to completing execution of all of the tasks in a given task group, execution of one or more tasks in another task group (e.g., a task group in which the tasks have a lower priority than the tasks in the given task group) may begin. In other embodiments, the execution of tasks in different task groups may be interleaved, or the order in which the tasks of different task groups are performed may be dependent on any of a variety of system-wide, application-specific, task/trigger-specific, or user-specified policies or parameter values.

Implementation Overview

To evaluate constrained data-driven parallelism (CDDP), according to one embodiment, a prototype has been implemented based on C++ macros and a runtime library. This prototype supports triggering via explicit calls to runtime library functions (e.g., one for immediate triggering, and one for deferred execution). These functions take as arguments the object that triggered the call and the handler function to run in response to the trigger condition being met. In this prototype, the runtime system manages tasks using a work-stealing scheduler based on an existing double-ended queue (deque).

In this prototype, task groups are implemented using a TaskGroup class, which exposes BeginTaskGroup and EndTaskGroup methods. The BeginTaskGroup method begins the "scope" of a task group, which owns all tasks spawned until the matching call to EndTaskGroup. The EndTaskGroup method returns a pointer to the task group object, which can be passed to the WaitForGroup method.

In some embodiments, each task group may keep track of whether any tasks remain to be executed in the current and next phases using scalable nonzero indicator (SNZI) objects. For example, deferred tasks may be kept in a deferred-task pool, and may be distributed among worker threads. When no tasks remain in the pool of tasks to be executed in the current phase, the runtime may determine whether there are any deferred tasks. If not, the task group's execution is complete. Otherwise, each thread may empty its portion of the deferred-task pool into its work queue (e.g., a double-ended queue, or deque), and the next phase may begin. In general, a SNZI object may be used to keep track of whether there are any tasks remaining to be executed in each phase and/or in a task group, but it may not indicate the exact number of tasks remaining One embodiment of a method for implementing constrained data-driven parallelism is illustrated by the flow diagram in FIG. 2. As illustrated in this example, the method may include a thread executing a given task in a data-driven computation (as in 210), and the execution of the given task spawning another task (as in 220). For example, the data-driven computation may represent an RPMG, an SSSP problem, or any other type of data-driven computation, in different embodiments. As illustrated at 230, in this example, the method may include the thread adding the spawned task to its task group.

If it is determined that the task should be scheduled for execution (shown as the positive exit from 240), the method may include the thread placing the spawned task in a pool of tasks to be executed in the current execution phase for the task group (as in 250). As described in more detail herein, determining whether to schedule the spawned task for execution or defer execution of the spawned task may be dependent on whether program instructions defining the spawned task specify that the spawned task should be deferred. As previously noted, in some embodiments, determining whether to schedule the spawned task for execution or defer execution of the spawned task may be dependent on a system-wide, application-specific, task-specific, or user-specified policy or parameter value.

Figure 2:
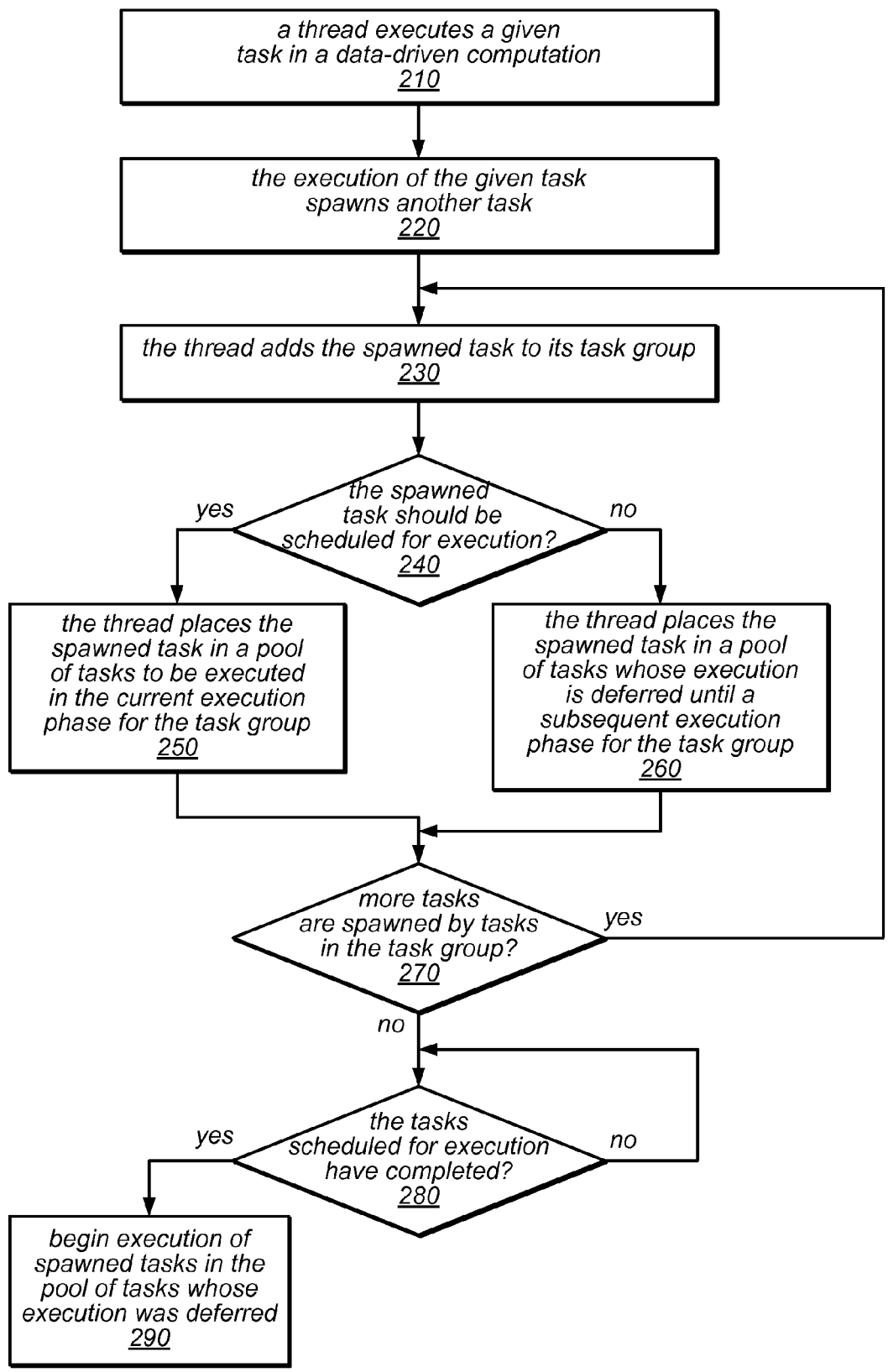
FIG. 2 is a flow diagram illustrating one embodiment of a method for implementing constrained data-driven parallelism, as described herein.

Note that in the example illustrated in FIG. 2, once a spawned task has been placed in a pool of tasks to be executed during the current execution phase (as in 250), the thread that spawned the task and/or a thief thread (if work stealing is enabled) may begin executing this spawned task and/or others in the pool of tasks to be executed in the current execution phase at any point. For example, in some embodiments, one or more of the spawned tasks in the pool of tasks to be executed in the current execution phase may be executed by the thread that spawned the task(s), while other spawned tasks in the pool of tasks to be executed in the current execution phase may be executed by another thread, according to an applicable work-stealing algorithm. If it is determined that the task should not yet be scheduled for execution (shown as the negative exit from 240), the method may include the thread placing the spawned task in a pool of tasks whose execution is deferred until a subsequent execution phase for the task group, as in 260.

As illustrated in this example, if more tasks are spawned by tasks in the task group (shown as the positive exit from 270), the method may include repeating the operations shown at 230-260 (as applicable) for each of the other tasks spawned by tasks in the task group (shown as the feedback from positive exit of 270 to 230). If there are no additional tasks spawned by tasks in the task group (shown as the negative exit from 270), but not all of the tasks scheduled for execution have completed (shown as the negative exit from 280), the method may include waiting until they have completed before beginning execution of spawned tasks in the pool of tasks whose execution was deferred. This is illustrated in FIG. 2 by the feedback from the negative exit of 280 to its input. As illustrated in this example, once the tasks scheduled for execution have completed (shown as the positive exit from 280), the method may include one or more threads beginning execution of spawned tasks in the pool of tasks whose execution was deferred, as in 290. Here again, one or more of the spawned tasks in the pool of tasks for which execution was deferred to the next execution phase may be executed by the thread that spawned the task(s), while other ones of the spawned tasks in the pool of tasks for which execution was deferred to the next execution phase may be executed by one or more threads other than the thread(s) that spawned them, according to an applicable work-stealing algorithm.

Figure 3:
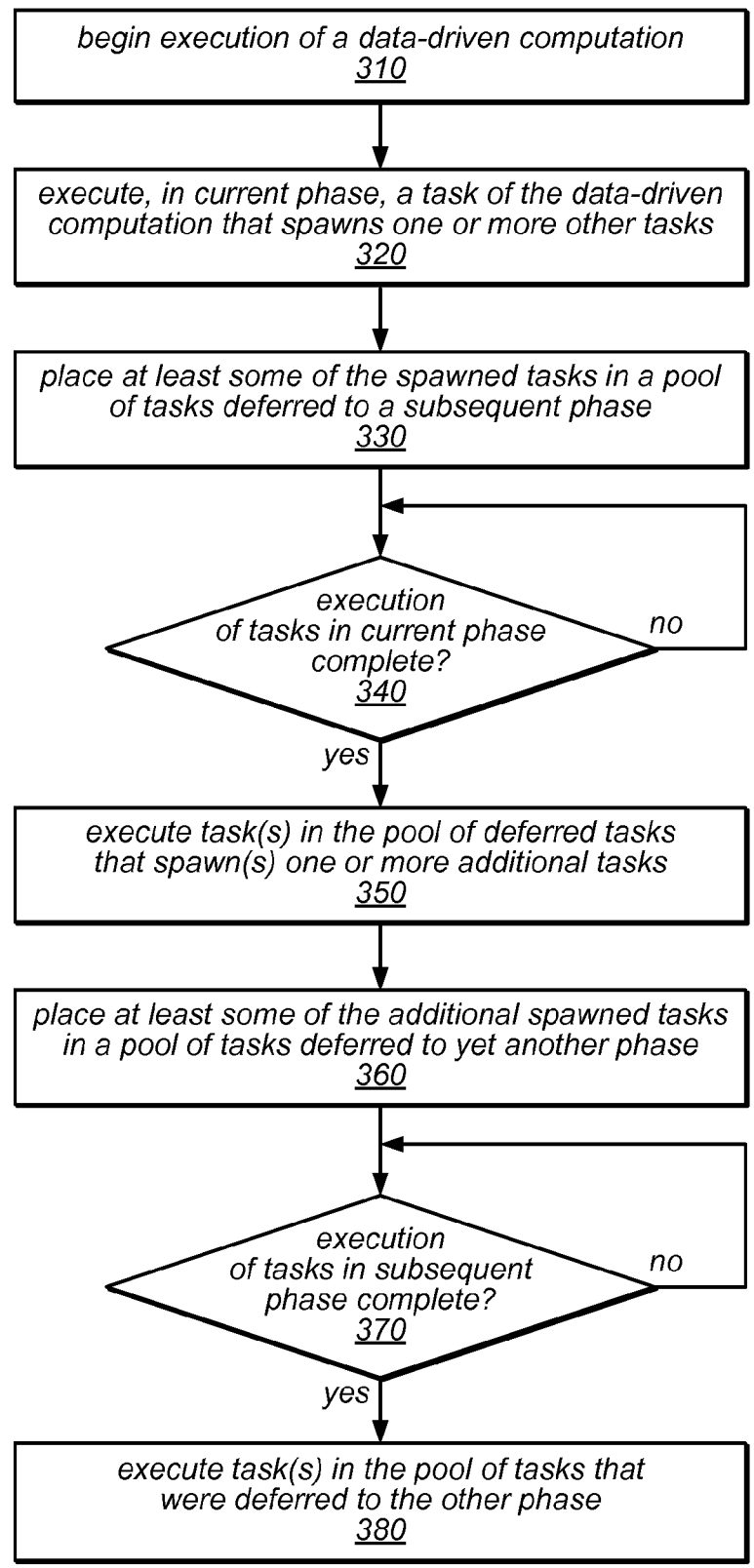
FIG. 3 is a flow diagram illustrating one embodiment of a method for implementing constrained data-driven parallelism in which tasks are deferred to multiple subsequent phases, as described herein.

Another embodiment of a method for implementing constrained data-driven parallelism (e.g., one in which tasks are deferred to multiple subsequent phases) is illustrated by the flow diagram in FIG. 3. As illustrated in this example, in some embodiments tasks executing in a first execution phase may spawn tasks to be executed in a subsequent phase, and tasks executed in the subsequent phase may spawn more tasks to be executed in yet another phase. As illustrated at 310, in this example, the method may include beginning execution of a data-driven computation, and executing (in a current phase, which may be referred to in this example as a first phase) a task of the data-driven computation that spawns one or more other tasks, as in 320. The method may include placing at least some of the spawned tasks in a pool of tasks whose execution is to be deferred to a subsequent phase (e.g., a second phase), as in 330.

As illustrated in FIG. 3, if the execution of tasks that are to be executed in the current (first) phase is not complete, the method may include waiting for them to be completed. This is illustrated in FIG. 3 by the feedback from the negative exit of 340 to its input. Once the execution of all the tasks that are to be executed in the current (first) phase is complete (shown as the positive exit from 340), the method may include executing one or more tasks that were placed in the pool of deferred tasks, some of which may spawn one or more additional tasks, as in 350. As illustrated in this example, the method may include placing at least some of these additional spawned tasks in a pool of tasks whose execution is to be deferred to yet another phase (e.g., a third phase), as in 360. As illustrated in this example, until the execution of the all tasks that were to be executed in the subsequent (second) phase is complete, the method may include waiting for them to be completed. This is illustrated in FIG. 3 by the feedback from the negative exit of 370 to its input. Once the execution of the all tasks that were to be executed in the subsequent (second) phase is complete (shown as the positive exit from 370), the method may include executing one or more tasks that were placed in the pool of tasks that were deferred to the other (third) phase, as in 380.

In some embodiments, application code may define a task group, which may include a single task. The code for the single task may specify a direct or indirect trigger that causes another task to be spawned. The code for the single task may also specify whether the spawned task is to be executed in the current execution phase or its execution is to be deferred to a subsequent execution phase, as described herein. One embodiment of a method for implementing constrained data-driven parallelism specified in application code is illustrated by the flow diagram in FIG. 4. As illustrated at 410, in this example, the method may include executing code that creates a new task group, and that code may include a single task. As described in more detail herein, in some embodiments, the code may also include a WaitForGroup method that blocks until all tasks in the group finish (not shown). As illustrated in this example, the method may include executing the single task, where the code for the single task specifies a direct or indirect trigger for spawning another task (i.e., a data-driven computation), as in 420.

Figure 4:
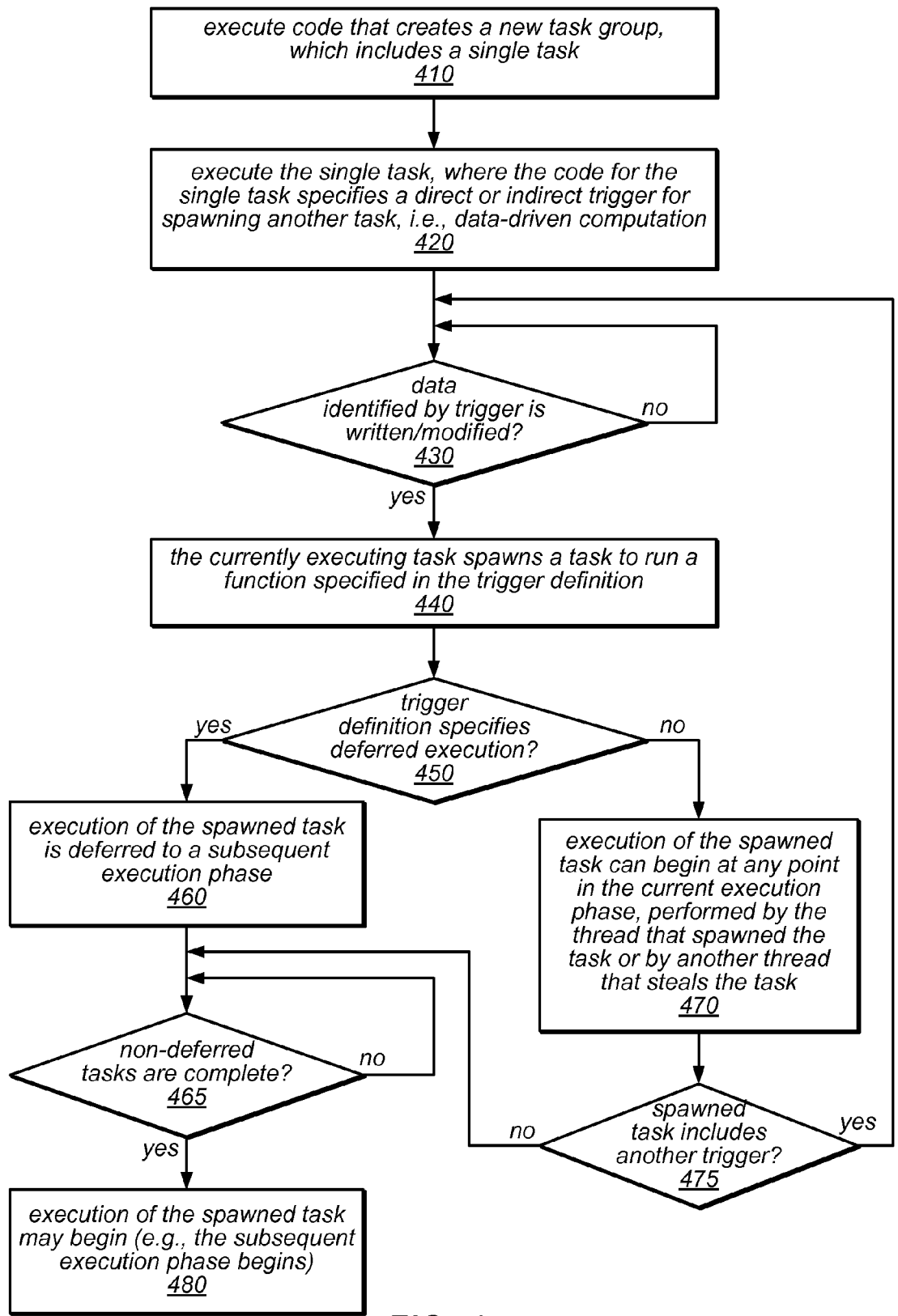
FIG. 4 is a flow diagram illustrating one embodiment of a method for implementing constrained data-driven parallelism specified in application code, as described herein.

Until the data identified by the trigger is written (e.g., modified), the method may include waiting for the data identified by the trigger to be written/modified. This is illustrated in FIG. 4 by the feedback from the negative exit of 430 to its input. If and when the data identified by the trigger is written/modified (shown as the positive exit from 430) the method may include the currently executing task spawning a task to run a function that was specified in the trigger definition, as in 440. For example, in some embodiments, the trigger definition may specify that an additional iteration of a looping or nesting construct should be run, or that an instance of a different function of the currently executing computation should be invoked in response to the trigger condition being met. In other embodiments, the trigger definition may specify a handler function that should be run (e.g., by the spawning thread, by a worker/thief thread in a work-stealing situation, or by the runtime system, in different embodiments) in response to the trigger condition being met. If the trigger definition specifies deferred execution (shown as the positive exit from 450), the method may include deferring execution of the spawned task is to a subsequent execution phase, as in 460.

If the trigger definition does not specify deferred execution (shown as the negative exit from 450), the method may include beginning execution of the spawned task at any point in the current execution phase, as in 470. For example, execution of the spawned task may be performed by the thread that spawned the task or by another thread that steals the task, in different embodiments. If (when executed) the spawned task specifies another trigger (shown as the positive exit from 475), the method may include repeating the operations illustrated in FIG. 4 beginning at 430, as applicable, for the other trigger (shown as the feedback from the positive exit of 475 to 430). Otherwise, the method may continue as illustrated at 465.

As illustrated in this example, until the execution of all non-deferred tasks is complete, the method may include waiting for the execution of all non-deferred tasks to be complete. This is illustrated in FIG. 4 by the feedback from the negative exit of 465 to its input. Once the execution of all non-deferred tasks is complete, the method may include beginning execution of the spawned task that was deferred (e.g., the subsequent execution phase may begin), as in 480.

Note that if a WaitForGroup method was executed for the task group when the task group was created, this method may block the execution of tasks in other task groups until execution of all of the non-deferred and deferred tasks in the current task group has been completed (not shown).

Figure 5:
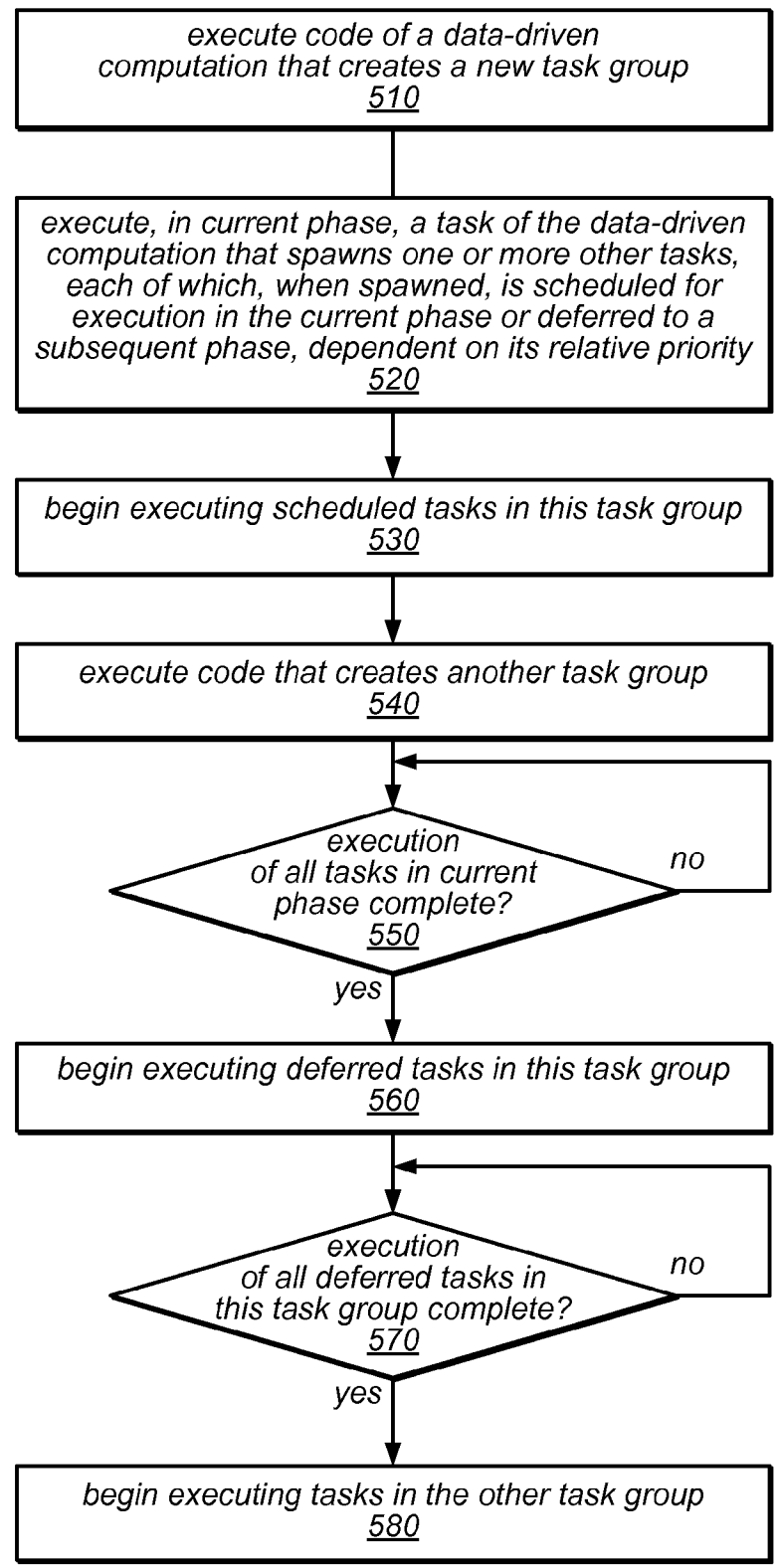
FIG. 5 is a flow diagram illustrating one embodiment of a method for implementing constrained data-driven parallelism based on the relative priorities of various tasks and/or task groups, as described herein.

One embodiment of a method for implementing constrained data-driven parallelism based on the relative priorities of various tasks and/or task groups is illustrated by the flow diagram in FIG. 5. As illustrated at 510, in this example, the method may include executing code that creates a new task group. As described herein, in some embodiments, the code may include a WaitForGroup method that blocks until all tasks in the group finish (not shown). As illustrated in this example, the method may include executing, in the current phase, a task of the data-driven computation that spawns one or more other tasks, each of which, when spawned, is scheduled for execution in the current phase or is deferred to a subsequent phase, dependent on its relative priority, as in 520. The determination of whether to schedule any given task for execution in the current phase or to defer its execution may be dependent on its priority relative to other tasks in the same task group (e.g., tasks spawned from the same task or from tasks that were spawned from the same task), or dependent on its priority relative to tasks in this and other task groups, in different embodiments. For example, in some embodiments, background tasks and/or tasks that are to be executed in a batch mode may have lower priority than foreground tasks, and may be relegated to subsequent execution phases (e.g., the phase immediately succeeding the current execution phase or any phase that follows the current execution phase).

As illustrated in this example, the method may include beginning execution of the tasks in the task group that are scheduled for execution in the current phase, as in 530. Note that, in some cases, additional tasks may be spawned and scheduled for execution during the current phase as execution of the scheduled tasks continues. As illustrated in this example, at some point (e.g., before or after executing any scheduled tasks in the task group, but subsequent to creating the first task group), the method may include executing code of the data-driven computation that creates another task group, as in 540. In some embodiments, the other task group (and/or the individual tasks of the other task group) may have a lower priority than the tasks in the currently executing task group (e.g., collectively or individually). In such embodiments, the method may include blocking execution of the tasks in the other task group until after all of the tasks in the higher priority first task group have completed execution. In embodiments in which a WaitForGroup method was executed when the first task group was created, the method may include blocking execution of the tasks in the other task group until after all of the tasks in the first task group have completed execution, regardless of the relative priorities of the task groups.

As illustrated in this example, until execution of all of the tasks in the task group that are scheduled for execution in the current phase is complete, the method may include continuing to execute these tasks until they are complete. This is illustrated in FIG. 5 by the feedback from the negative exit of 550 to its input. Once execution of all of the tasks in the task group that are scheduled for execution in the current phase is complete, the method may include beginning execution of any tasks in this task group for which execution was deferred to one or more subsequent phases, as in 560. As illustrated in this example, until execution of all deferred tasks in this task group is complete, the method may include continuing to execute the deferred tasks in this task group (e.g., in one or more subsequent execution phases). This is illustrated in FIG. 5 by the feedback from the negative exit of 570 to its input. Note that within each subsequent execution phase, each of the tasks scheduled for execution in the phase may be executed in order of its priority relative to other tasks scheduled for execution in the phase. Once execution of all deferred tasks in this task group is complete, the method may include beginning execution of tasks in the other task group, as in 580.

Although not illustrated in FIG. 5, in some embodiments, the techniques described herein for implementing constrained data-driven parallelism may support the interleaving of tasks between task groups. For example, in some embodiments, the placement of spawned task within pools of tasks to be scheduled for execution or to be deferred may be based on a global prioritization (e.g., placement of a given spawned task may be dependent, at least in part, on the priority of the given spawned task relative to tasks in the same task group and/or tasks in one or more other task groups). In some embodiments, spawned tasks that are to be executed as background tasks or in a batch mode may be given a lower priority than foreground tasks, regardless of the task groups to which they belong. Such tasks may be placed in a shared (or global) pool of deferred tasks to be executed asynchronously (e.g., worker/thief threads in a work-stealing situation, or by the runtime system), without regard for the order in which other tasks in their task groups are scheduled for execution.

In various experiments, constrained data-driven parallelism (CDDP) has been evaluated using several applications, including SSSP, BC (betweenness centrality, a social network analysis algorithm), and Communities (a graph clustering algorithm). The data-driven solutions described herein have been compared against parallel implementations using the OpenMP API. In these experiments, it has been observed that CDDP delivers competitive, or significantly better, performance across most benchmarks and inputs. In another experiment, a discrete-event simulator in which the computation is structured entirely via data dependencies between tasks was ported to a CDDP solution. The performance of the CDDP solution was observed to be consistent with results reported by others.

Single-Source Shortest Paths (SSSP)

As discussed above, various relaxation algorithms, such as SSSP, may be well-suited for the application of data-driven parallelization. In some embodiments of the systems described herein, in order to reduce the overhead of spawning tasks, a single task may be spawned that relaxes all the edges of a node whose distance estimate is updated, rather than spawning a separate task for each edge. In some embodiments, a per-node pendingRelaxation flag may be introduced that indicates whether the node's distance estimate has been modified since its edges were most recently relaxed, and relaxation may be triggered when this flag is set to true, rather than when the distance estimate is updated. This may allow multiple successive updates to be handled by a single task that calls the following function:

```
1   void RelaxNeighbors(Node *n)
2      n->pendingRelaxation = false
3        forall (Node *k in neighbors(n))
4          newDist = n->dist + weight(n,k)
5          bool* pendingFlagP = &k->pendingRelaxation
6          *pendingFlagP triggers RelaxNeighbors(k)
7          currDist = k->dist
8          while(newDist < currDist)
9            if (CAS(&k->dist, currDist, newDist))
10              // Triggers on successful CAS
11              CAS(pendingFlagP, false, true)
12              break
13            currDist = k->dist
```

Note that in this example, the code uses an indirect trigger to trigger the RelaxNeighbors method when the flag changes from false to true at line 11, but not when the flag is set to false at line 2.

Three versions of this algorithm have been evaluated. The first version, the DD-Wild algorithm, uses "classical" work-stealing, in which each thread pushes and pops tasks on one end of its deque, and thieves steal from the other end. With only a single worker thread, this implies last-in-first-out (LIFO) execution of tasks. The second version, the DD-Phased algorithm, uses the same algorithm and runtime, but includes the option of deferred triggering (e.g., adding the deferred annotation at line 6). Finally, the third version, the DD-Fifo algorithm, uses immediate triggering with a modified version of the runtime system in which threads access their deques in first-in-first-out (FIFO) order with self-stealing (e.g., pushing tasks on one end, but with workers and thieves popping tasks from the other end).

Figure 6A:
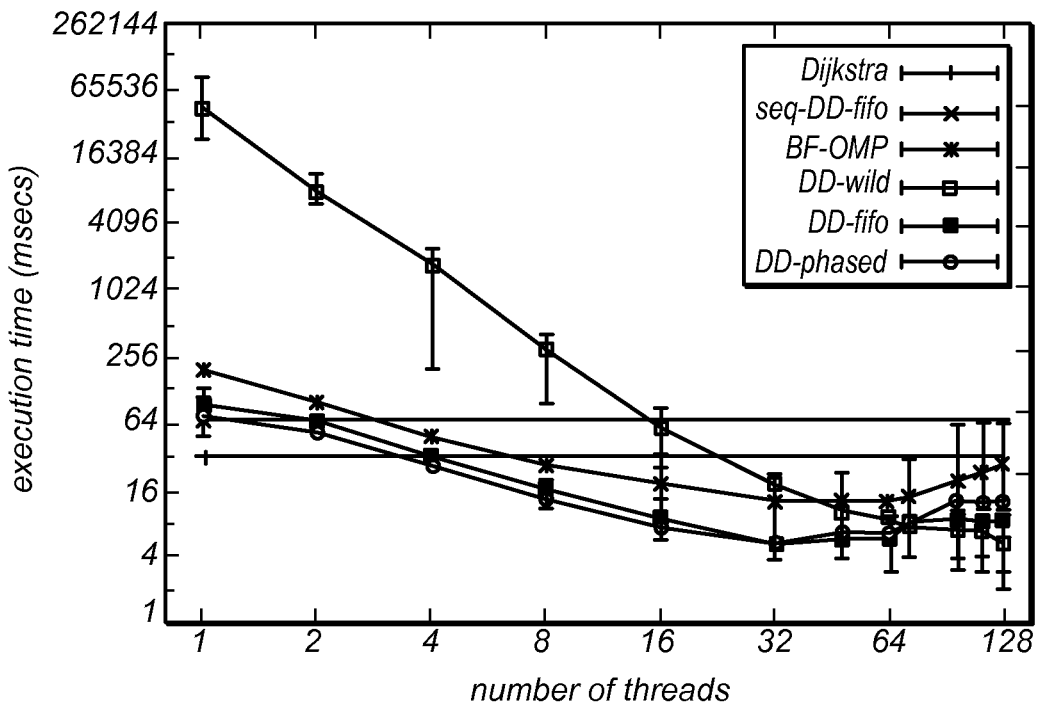
FIGS. 6A and 6B are graphs illustrating comparisons between data-driven algorithms and a series of alternatives, according to various embodiments.
Figure 6B:
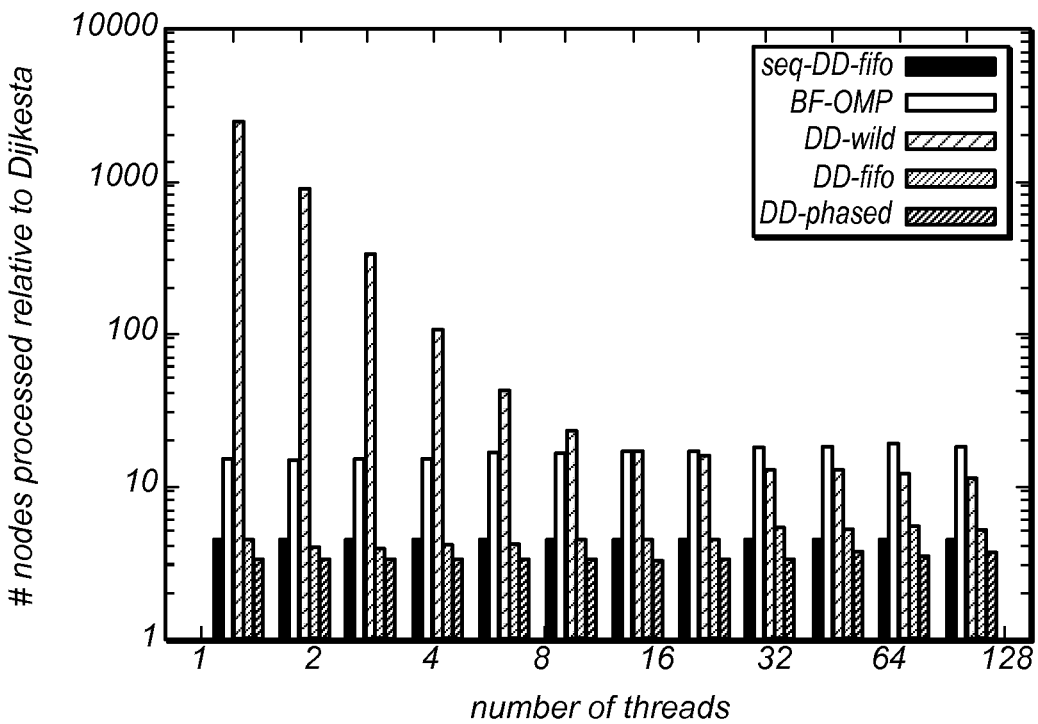

FIGS. 6A and 6B illustrate comparisons between these data-driven algorithms and a series of alternatives. More specifically, the graph in FIG. 6A illustrates SSSP execution time for each approach (using a mean of 10 runs with different source nodes, with the error bars showing the min and max execution times), while the graph in FIG. 6B illustrates work performed using each approach, normalized to a classic sequential SSSP algorithm (labeled as "Dijkstra"). In this example, BF-OMP is parallel version of the Bellman-Ford algorithm based on the OpenMP API. In this example, write-write conflicts were avoided by having a task relax all incoming edges of a node. In this example, the Seq-DD-Fifo algorithm is a sequential version of DD-Fifo that does not use the new abstractions for constrained data-driven parallelism described herein (this is used to estimate the overhead imposed by the runtime system for the constrained data-driven parallelism approach described herein). In this example, the graph uses a ca-HepPh collaboration network from SNAP (one that includes 12,008 nodes and 237,042 edges). Graphs from a variety of benchmark suites show qualitatively similar results. Note that the results are shown in a log-log scale.

As these results illustrate, the order in which tasks are executed may have a huge effect on execution times and/or on the amount of work performed. For single-thread runs, DD-Wild, which runs tasks in LIFO order (e.g., it traverses the graph depth-first), is 250× slower than BF-OMP, whereas DD-Phased and DD-Fifo (which approximate a breadth-first search, or BFS, traversal) are about 2× faster than BF-OMP. The Dijkstra algorithm, which relaxes nodes in an optimal order and avoids the overhead of spawning and synchronizing tasks, is about 6× faster than BF-OMP. Comparing Seq-DD-Fifo and DD-Fifo shows that the overhead of the runtime system for constrained data-driven parallelism is about 50%, in this example.

In this example, the data-driven algorithms all scaled well up to 32 threads, with DD-Phased and DD-Fifo slightly improving their lead over Bellman-Ford (and outperforming Dijkstra with 4 or more threads), and DD-Wild rapidly catching up. Although DD-Fifo was 27% slower than DD-Phased with one thread, DD-Fifo outperformed it by 42% at 127 threads. Perhaps surprisingly, DD-Wild exhibited super-linear speedup, and with 72 or more threads, it outperformed all of the other algorithms.

These results may be better understood by examining FIG. 6B, which illustrates the total amount of work done by each algorithm, measured by the number of nodes processed. With a single thread, DD-Wild performs 500× more work than DD-Fifo, and 125× more work than BF-OMP, its closest competitor, because of its LIFO execution of tasks. However, with more threads, this LIFO execution is increasingly disrupted by work-stealing, resulting in a better order for computing SSSP, and a corresponding reduction in total work. For all other parallel algorithms, the work increases slightly as the thread count increases, with DD-Phased doing the least work at all thread counts, explaining its relatively good performance at low thread counts. However, at high thread counts, the waiting due to phases appears to limit its scalability, and DD-Fifo and DD-Wild outperform it. Although DD-Wild performs more work than DD-Fifo, it outperforms DD-Fifo at high thread counts because it avoids the synchronization overheads that DD-Fifo incurs due to self-stealing.

Betweenness Centrality

Betweenness Centrality (BC) is a measure of the importance of each node in a graph in terms of the number of shortest paths going through that node. A program written in the Green-Marl language (a domain-specific language for graph analysis), referred to herein as bc-GM, approximates BC. Briefly, bc-GM performs a breadth-first search (BFS) traversal rooted at a randomly selected node, recording the number of shortest paths from the root to each node, and then does a reverse-BFS (rBFS) traversal, recording at each node the number of shortest paths from the root to other nodes that go through it. This process is repeated several times.

A data-driven variant of BC (referred to herein as bc-DD) was developed in which the BFS traversals are done using task group phases, and the rBFS traversals are done in classic data-driven fashion. The BFS and rBFS tasks in bc-DD can be overlapped to some degree, improving overall parallelism. Note that, in contrast to SSSP, executing the tasks in phases may be required for correctness, to ensure BFS traversal.

In various experiments, the bc-DD algorithm consistently outperformed bc-GM (by up to 2×) for some graphs. However, for others, it was competitive at low to moderate thread counts (1-32), but deteriorated thereafter to the extent that bc-GM outperformed it by up to 2× at 128 threads. These results may primarily be due to differences in the runtimes targeted by the two algorithms (e.g., a runtime based on the OpenMP API in the case of bc-GM). The work-stealing runtime employed in these experiments may provide better load balancing than the runtime based on the OpenMP API, but may be less scalable than is desirable, in some cases.

The Betweenness Centrality (BC) application may be described as follows:
  It includes a complex workload with multiple handler functions.
  It performs BFS flood from one node, then reverse-BFS after reaching leaves of BFS tree.
  It may include lock-based or STM-based synchronization.

The Green-Marl approach to the BC application may be described as follows:
  It performs BFS traversal from each node.
  It counts the number of shortest paths coming from up-neighbors (i.e., "sigma").
  It performs reverse-BFS traversal over graph.
  It accumulates BC scores from down-neighbors (i.e., "delta").

In some embodiments, a constrained data-driven approach to BC (e.g., one that employs atriggers or other techniques to implement constrained data-driven parallelism) may be described as follows:
  It floods "sigma" values out from initial node.
  It updates one node triggers tasks for its down-neighbors and builds up reverse-BFS tree.
  If there are no down-neighbors, it switches to computing "delta" values, going back up the BFS tree.

Community-Based Graph Clustering

Another example application that has been used to evaluate constrained data-driven parallelism is a clustering algorithm that partitions a graph into communities, each of which includes nodes that are relatively strongly connected to each other and relatively weakly connected to nodes in other communities. In some experiments, the community-based application was built on a sequential round-based algorithm (referred to herein as "Serial"). In these experiments, in each round, the algorithm iterates over all nodes in a random order, and assigns each node to the community with a plurality of its neighbors (with ties being broken at random). The algorithm terminates after a round in which no node changes community.

More specifically, in an application to perform graph decomposition into "Communities", each of the nodes may be initialized with unique labels, and the algorithm may try to change those labels to adopt the labels most popular amongst their neighbors. A sequential algorithm for such a decomposition may have the following characteristics:
  It may be an iterative algorithm.
  It may pick a random permutation of the nodes.
  It may process nodes in that order.
  It may stop when there are no more changes.

The OMP algorithm is a parallel version of this algorithm that uses a parallel for loop of the OpenMP API to iterate over the nodes at each round. However, both Serial and OMP can perform large amounts of unnecessary work. For example, a node changes its community in a round only if at least one of its neighbors changed its community recently (in the last or the current round). Similar observations have been made for other applications.

Based on this observation, four data-driven variants of this algorithm were evaluated: DD-Wild, DD-Fifo, DD-Phased, and DD-Mixed. In all of them, updating a node's community triggers tasks for its neighbors. In these evaluations, to begin the computation, a parallel for loop is used to assign a unique community to each node, triggering computation across the graph. The first three variants are similar to the corresponding SSSP variants. In DD-Mixed, a task to process a node is triggered in the current phase if that node has not already been processed in the current phase; otherwise, the task is deferred to the next phase. This more closely imitates Serial, with DD-Mixed's phases corresponding to rounds in Serial.

Figure 7:
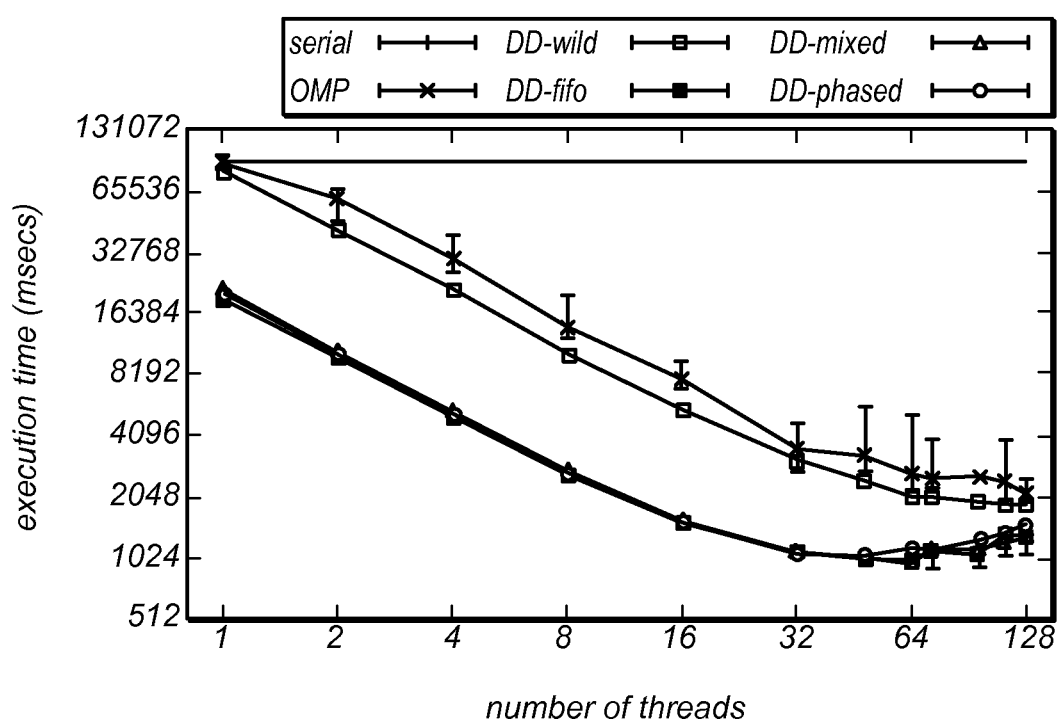
FIG. 7 is a graph illustrating, on a log-log plot, the execution times for a product purchasing graph, according to various embodiments.

All of the algorithms were evaluated on various SNAP graphs, using the modularity metric to confirm that the "quality" of the results achieved by the parallel algorithms are similar to or better than those of Serial. FIG. 7 illustrates, on a log-log plot, the execution times for a product purchasing graph (e.g., one with 10,236 nodes and 3,356,824 edges). Note that the graph was converted to an undirected graph by adding the reverse edges, as this algorithm requires an undirected graph.

In these evaluations, the data-driven algorithms outperformed Serial and OMP algorithms in every case. As with SSSP, constraining task execution order substantially improved performance. In particular, DD-Wild performed considerably worse than all other data-driven variants. At all thread counts, the total amount of work performed by DD-Wild was significantly more than the work performed by the other data-driven variants (e.g., about 40% versus 15%, normalized to the Serial algorithm). Single-threaded OMP performed the same amount of work as Serial, and at higher thread counts, it usually performs even more work than Serial (by 14-50%). This may be why it performed worse than DD-Wild.

Because DD-Mixed was designed to imitate the behavior of Serial, the number of rounds for Serial to converge was compared to the number of phases taken by DD-Mixed. Indeed, the two numbers were very similar for most graphs. However, for one graph, the number of serial rounds was an order of magnitude higher than the number of data-driven phases, regardless of the random order in which Serial processed the nodes. That led to a serial execution time that was 40× longer than that of DD-Mixed, and suggests that, for some graphs, the data driven order of processing can lead to faster convergence than that achieved with most random orders.

In some embodiments, a constrained data-driven approach to such a decomposition (e.g., one that employs atriggers or other techniques to implement constrained data-driven parallelism) may be described as follows:
  It attaches a handler to each node.
  It spawns a task for each node at most once per phase.
  It uses phases to defer tasks for nodes that the algorithm wants to visit again.
For parallel variants of the Communities decomposition, an approach based on the OpenMP API may:
  Iterate over all nodes in a parallel for loop
  Read neighbors' current states without synchronization In some embodiments, a constrained data-driven approach to a parallel variant of the Communities decomposition (e.g., one that employs atriggers or other techniques to implement constrained data-driven parallelism) may be described as follows:
  It reads neighbors' current states without synchronization.
  It skips redundant work (e.g., it only triggers tasks for neighbors when updating its own label).
  A neighbor not already processed in current phase spawns tasks in the current phase.
  A neighbor already processed in the current phase spawns tasks that are deferred until the next phase.

In some embodiments, a constrained data-driven approach to a parallel variant of the Communities ecomposition (e.g., one that employs atriggers or other techniques to implement constrained data-driven parallelism) that always defers spawned tasks may be described as follows:
  It reads neighbors' current states without synchronization.
  It skips redundant work (e.g., it only triggers tasks for neighbors when updating its own label).
  It always defers processing neighbors until the next phase.

Note that data-driven parallelism stems from early work on data-flow computation. In those systems, data dependencies between instructions drive execution. The systems described herein for implementing constrained data-driven parallelism (CDDP) may, in some embodiments, work at a coarser level (e.g., typically, tasks access locations and perform local computations). One earlier programming model provides a form of data-flow computation using coarse-grained tasks. With this model, synchronization is provided via barriers, which wait until all spawned tasks are complete. By contrast, with CDDP, the use of phases may avoid the need to wait for all tasks to complete before new tasks can be spawned. Instead, in some embodiments, barriers may be placed at the end of the work queue for each execution phase, but new tasks may continue to be spawned for execution in the current execution phase or for execution in a subsequent execution phase prior to completing execution of all of the tasks to be executed in the current execution phase. Some researchers have explored combinations of data-flow programming models and atomic tasks. However, these systems do not provide CDDP's control over the scheduling order of parallel tasks. In some embodiments, the systems described herein for implementing CDDP may not require tasks to be atomic, while in other embodiments they may be required to be atomic. In another earlier project that includes data-driven tasks, tasks are spawned explicitly, and futures allow synchronization on tasks as they complete. In some embodiments of the systems described herein for implementing CDDP, the focus may be on constraining the order of tasks as they run, rather than on waiting for specific tasks to finish.

Recent work on incremental and self-adjusting computation has explored the ability to avoid repeating unnecessary work. For example, substantial improvements in execution time have been demonstrated using data-triggered threads. While the systems described herein for implementing CDDP may benefit from a similar ability to avoid repeated work, they may provide additional control over how parallel work is scheduled. Researchers have often observed that different workloads perform best under different schedulers. In contrast, CDDP's abstractions may allow the programmer to constrain task ordering without requiring a full scheduler to be written and/or without requiring a single policy to be applied to a complete process. The use of phases in task groups described herein may build on ideas in the classic bulk synchronous parallel (BSP) programming model, but BSP targets different kinds of computations than CDDP.

In the systems described herein for implementing CDDP, parallel task execution may be driven by changes to data, and the programmer may be able to impose additional constraints on the order in which tasks run. As described herein, preliminary explorations have focused on a set of abstractions for expressing parallelism and for imposing constraints on execution order. The initial results suggest that these abstractions can provide significant performance improvements. Compared with "unconstrained" approaches, the techniques described herein for implementing CDDP may enable the programmer to avoid pathologically bad scheduling orders. Compared with non-data-driven algorithms, CDDP may avoid repeating computations when data does not change. While initial explorations have focused on graph algorithms on different kinds of input (e.g., planar graphs versus small-world graphs), in some embodiments, these techniques may be applied to a broader range of applications and algorithms. In some embodiments, CDDP may include a notion of atomic tasks. These tasks may execute atomically and in isolation from one another. In addition to CDDP's existing constraints, each of these tasks may be required to execute after the atomic task that triggered it. Introducing atomicity may simplify programming by preventing tasks from observing each other's intermediate states. In addition, it may be possible to use one mechanism for detecting conflicts between tasks and for detecting when a new task should be spawned, in some embodiments.

In some embodiments, the syntax for expressing constraints may be refined, and language support may be provided. For example, embodiments that employ triggers (including, but not limited to those in which atomicity is introduced) may include compiler support.

Note that an initial implementation used for at least some of the evaluations described herein supports execution only within a single shared memory system. In other embodiments (e.g., in response to increasing interest in large data sets), the approaches to CDDP described herein may be implemented using similar programming abstractions but that are not limited to a single shared memory system. This may enable exploration of a number of interesting issues, such as adapting the algorithms (perhaps dynamically) to use more systems when there is sufficient parallelism available, without requiring programmers to rewrite their applications.

As noted above, in some embodiments, the systems described herein may employ a programming abstraction called the atomic trigger (or "atrigger"), which enables programmers express parallelism in the form of data dependencies between computation "chunks" that are executed atomically. The abstraction may enable a declarative style of expressing parallelism, which may be convenient for programming certain applications.

In some embodiments, the atomic trigger may be used to transform data dependencies into control dependencies between concurrent atomic tasks, and in turn may enable expression of complex computations as networks of smaller concurrent atomic tasks in a data-driven style. In some embodiments, the use of atriggers may provide a (possibly simpler) declarative approach to express concurrency in a parallel program. In some embodiments, the underlying concurrent execution of the atomic tasks created by data dependencies may be done transparently by the runtime system. In some embodiments, all the programmer needs to do is identify the sources of data dependencies between sub-computations of a larger computation (namely variables that pass values between the sub-computations), designate them with a special "atomic trigger" status, and "attach" the sub-computations to the variables in the form of atomic read/write event handlers.

In some embodiments, an atomic trigger may manifest as a special library object, or via the use of special language level constructs (as described herein) that designate objects as atomic triggers. Each atomic trigger may generate two kinds of events (e.g., read events and write events), and may have a corresponding pair of event (or trigger) handlers (which may manifest as specially annotated functions or methods in the program). A read or write of an atomic trigger, within the scope of an atomic block, may asynchronously (e.g., at the end of the atomic block's execution) fire off the corresponding "trigger handler", which itself is another atomic task. In some embodiments, the spawned atomic task itself may access more atomic triggers to trigger execution of even more atomic tasks. In some embodiments, the programmer may be able to code a complex web of dependent atomic tasks by carefully linking atomic triggers and their handlers in a declarative fashion. This approach may enable programmers to easily express control dependencies in terms of data dependencies, which may be a more natural and convenient way to program a wide variety of applications.

In some embodiments, atomic triggers may be used effectively to cause a program to generate a cascade of trigger handlers at a time, thus injecting massive amounts of parallelism in a program. As previously noted, the systems described herein may provide a means to the programmer to wait for a cascade of events to complete execution. This may enable the programmer to write programs that generate and utilize data-driven concurrency in phases, separated by steps that either aggregate results from the previous phase, that do some additional computation to generate more work for the next phase, or that do both.

In some embodiments, atomic triggers may be expressed as privileged objects that, when accessed within atomic blocks, trigger an event that is handled by a programmer specified trigger handler. The trigger handler in turn may be an asynchronously executable atomic task that is executed by the runtime system after the triggering atomic block (or task) commits. Since they are atomic, trigger handlers may also access one or more atomic triggers, which in turn may trigger execution of more trigger handlers. Thus, as noted above, a program may generate a cascade of asynchronous atomic tasks (or trigger handlers) at a time, leading to a potentially huge amount of parallelism in the application.

In order to generate parallelism in the application, the programmer may specify each object that needs to be classified as an atomic trigger, and may "register" blocks of code (which manifest as specially annotated methods, in some embodiments) as handlers for each trigger. In some embodiments, parallelism may be generated in the program in a data-driven style by way of trigger handlers transitively accessing more atomic triggers. The parallelism may thrive on the "fan-out" ratio of each trigger handler, such that the more triggers a handler touches (resulting in firing of a higher number of trigger handlers), the more parallelism can be generated in the program.

In some embodiments, the trigger handlers may be executed by the runtime system in a way that is completely transparent to the programmer. For example, in some embodiments, the runtime system may be implemented as a pool of worker threads that work with a work-stealing scheduler to execute the triggered handlers. In some embodiments, each handler may be executed atomically.

In some embodiments, the RPMG described above may be implemented using atomic triggers as follows: Each space block may act as an atomic trigger that would be triggered by the moving/acting persona's changes to the block's state. The corresponding trigger handler would peruse through the list of all the personalities that have the block in their radius of visibility, and "inform" them about the change in the block's state. The informing may again be done via an atomic trigger for each persona. In the case that the informed persona is controlled by the game engine, its trigger handler may be responsible to react to the perceived change in its environment. If the persona is controlled by a player, the handler may perform graphics rendering to reflect the environmental change on the player's display screen. This data-driven structure of the computation may naturally captures the spirit of how the scenario plays out in the game.

An atomic triggers model may be described in the context of the Java™ programming language, according to one embodiment. As described herein, a small set of new language level constructs may be introduced to help programmers express atomic triggers, the mapping between triggers and their handlers, and a set of operations that apply to groups of trigger handlers. In some embodiments, language extensions, rather than libraries, may be used, i.e., language support may help to deliver the programmability promise of atomic blocks, and the related abstractions (e.g. atomic triggers).

Designating Variables as Atomic Triggers

The systems and methods described herein may employ a new type modifier called the atrigger (short for "atomic trigger") that programmers can apply to primitive types in the Java programming language. For example, in one embodiment, an atomic trigger of type int may be defined as follows:

atrigger int intTrigger;

Similarly, an atomic trigger of a reference type may be defined as follows: atrigger SomeObject objTrigger;

Note that reference type triggers may not entail that the objects they point to are also atomic triggers. To do so, the programmer may explicitly annotate the fields of such objects as atriggers. Atomic triggers may thus take the form of individual Java object or class fields.

Note that in other embodiments, there may be other ways of expressing atomic triggers. For instance, it may be possible to express atriggers as special library wrappers around primitive types, which may be reminiscent of boxed data types.

Trigger Handlers

In some embodiments, atomic triggers may be accessed both from inside and outside atomic blocks. Outside the atomic blocks, atrigger field accesses may act just like ordinary Java object or class field accesses. However, access of atriggers inside atomic blocks may asynchronously trigger execution of a programmer specified handler that itself is executed as an atomic task. In some embodiments, the trigger handler may be executed only after the triggering atomic block or task commits.

In some embodiments, a new parameterized method level annotation called the @ATriggerHandler may be introduced that takes a Boolean expression as its argument. This Boolean expression may be used to express the set of atomic triggers and the respective events that trigger execution of the method as an atomic task. The systems described herein may support two types of events related to an atrigger A: the @ATriggerReadEvent (where A is read in an atomic block or task), and the @ATriggerWriteEvent (where A is written in an atomic block or task). Multiple reads or writes to the same atrigger in an atomic block or task may generate only one @ATriggerReadEvent or @ATriggerWriteEvent event, respectively. The Boolean expression in the @ATriggerHandler may contain only conjunction (logical AND) and disjunction (logical OR) operators. In various embodiments, @ATriggerReadEvent and @ATriggerWriteEvent may be special annotations that take a class or instance field as a parameter. This class or instance field may be required to be visible to the scope in which the annotation appears. As an example, consider the following method annotation:

```
atrigger int foo;
...
@ATriggerHandler(@ATriggerReadEvent(foo))
public void someMethod( ) {
    ...
}
```

The code in the example above declares someMethod( ) as a trigger handler for an @ATriggerReadEvent on atrigger foo. This means that whenever foo is read in an atomic block or task, an @ATriggerReadEvent is generated by the runtime system, which triggers execution of someMethod( ) as an atomic task. Note that, in this example, foo must be declared as an atrigger.

The example class presented below illustrates one representation of atomic handlers. In this example, the class Test contains three atrigger fields: i, c, and b, and four @ATriggerHandlers: iHandler, cHandler, icHandler, and icbHandler. In this example, iHandler may be triggered for execution as an atomic task when an atomic block or task writes to i. This is instructed by the programmer with an @ATriggerHandler annotation with the parameter that describes an @ATriggerWriteEvent on i. This means that iHandler will be executed as an atomic task by the runtime system when an atomic block or task writes to i. Similarly, cHandler is defined with the annotation that describes an @ATriggerReadEvent on c. In this example, icHandler illustrates an example of a conjunction of two events. More specifically, icHandler will be executed as an atomic task by the runtime system only if both the events are triggered by a single atomic block or task. The icbHandler handler illustrated herein is another handler that is triggered by a more complex condition. As illustrated in this example, the programmer may provide arbitrary Boolean expressions on atrigger events to map atriggers onto the respective event handlers. In some embodiments, it may be the job of the compiler and/or the runtime systems to ensure that the mappings and uses of handlers happen correctly at run time. Note that other mechanisms for representing mappings between atriggers and their handlers may be employed in other embodiments.

Computation Model

In some embodiments, atomic triggers and their handlers, when connected together carefully by the programmer, may be used to construct elaborate computation trees in which each node is an atomic task (except the root node, which is an atomic block instead) triggered by some access (read or write) to a set of atriggers, and in which edges denote the parent-child relationship between atomic tasks, where the parent task directly triggers the child task. In some embodiments, a child task can be executed only when its parent completes execution. As previously noted, in some embodiments the atomic tasks triggered by atriggers may be executed by the runtime system, rather than the user thread (s), asynchronously. As a result, sibling atomic tasks (e.g. tasks triggered from the same atomic block or task) may be able to execute in any order. Thus, tasks in each path from the root to a leaf in the computation tree may be guaranteed to execute in that order, whereas there is no ordering guarantee between tasks that do not belonging to the same root-to-leaf path. The resulting program execution may consist of a forest of computation trees, each of which is rooted in an atomic block executed by a user thread (e.g., a thread created by the programmer, or the main program thread).

It has been observed that, for many applications, since atomic tasks can be executed concurrently with other atomic tasks, and since atomic tasks can trigger execution of more atomic tasks via accesses to atriggers, the programmer may not need to explicitly create user threads to generate parallelism in the application. In some embodiments, the single, main application thread may act as a "controller" that dispatches execution of cascades of atomic tasks, directly or indirectly, via atriggers. One such application, a parallelized Satisfiability solver, is described below. Note that the use of multiple user threads may be a more natural way to program some applications (e.g. the RPMG application discussed above). However, such applications may use atriggers to generate additional parallelism, in some embodiments.

An example program illustrating how atriggers and their handlers are expressed by the programmers is shown below, according ton one embodiment. In this example, @ATriggerReadEvent and @ATriggerWriteEvent are special annotations, and member field names are parameters.

```
class Test {
    atrigger int i;
    atrigger char c;
    atrigger Boolean b;
    @ATriggerHandler(@ATriggerWriteEvent(i))
    public void iHandler( ) {
        // method body
    }
    @ATriggerHandler(@ATriggerReadEvent(c))
    public void cHandler( ) {
        // method body
    }
    @ATriggerHandler(@ATriggerWriteEvent(i) &&
            @ATriggerReadEvent(c))
    public void icHandler( ) {
        // method body
    }
    @ATriggerHandler((@ATriggerWriteEvent(i) &&
            @ATriggerWriteEvent(c)) ||
            @ATriggerReadEvent(b))
    public void icbHandler( ) {
        // method body
    }
}
```

Figure 8:
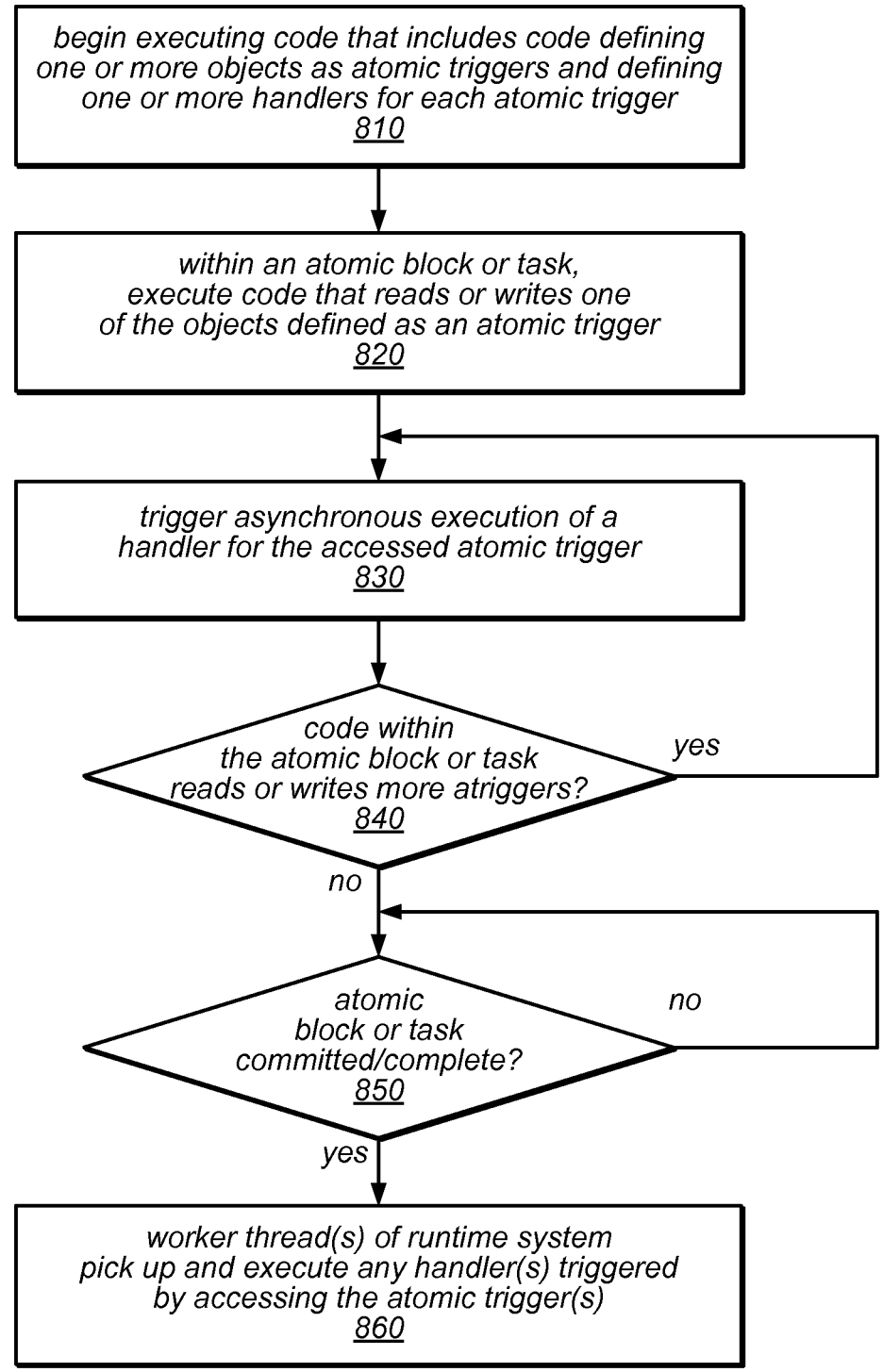
FIG. 8 is a flow diagram illustrating one embodiment of a method for implementing constrained data-driven parallelism using atomic triggers, as described herein.

One embodiment of a method for implementing constrained data-driven parallelism using atomic triggers is illustrated by the flow diagram in FIG. 8. As illustrated at 810, in this example, the method may include beginning execution of code that includes code defining one or more objects as atomic triggers and defining one or more handlers for each atomic trigger. In various embodiments, the code may define triggers of different types (e.g., triggers on read events, triggers on write events, and/or more complex triggers). In some embodiments, defining the handlers may include registering them with the runtime system. As illustrated in this example, the method may include, within an atomic block or task, executing code that reads or writes one of the objects that was defined as an atomic trigger (as in 820). In response, the method may include triggering the asynchronous execution of a handler that was defined for the accessed atomic trigger (as in 830). For example, in some embodiments, the handler may be added to a pool of tasks to be executed atomically by the runtime system following commitment of the enclosing atomic block or task (e.g., the atomic block or task within which the atomic trigger was accessed.

As illustrated in FIG. 8, if the code within the atomic block or task reads or writes any additional atomic triggers (shown as the positive exit from 840), the method may include triggering the asynchronous execution of a respective handler for each additional atomic trigger that was accessed from within the atomic block or task. This is illustrated in FIG. 8 by the feedback from the positive exit of 840 to 830. If the code within the atomic block or task does not read or write any additional atomic triggers (or once all such accesses have been encountered, triggering asynchronous execution of their respective handlers), once the enclosing atomic block or task commits (or its execution has been otherwise completed), the method may include one or more worker threads of the runtime system picking up and executing any handlers that were triggered by accessing the atomic trigger(s). In other words, the method may include waiting for the enclosing/calling atomic block or task to be committed/completed before executing any of the handlers that were triggered as part of the execution of the enclosing/calling atomic block or task. This is illustrated in FIG. 8 by the path from positive exit from 850 to element 860, and by the feedback from the negative exit of 850 to its input.

Aggregating Trigger Cascades

As previously noted, in some embodiments a single atomic block that accesses one or more atriggers may lead to execution of a cascade of atomic tasks. It has been found that, in some embodiments, providing the programmer with tools to control such atomic task cascades (e.g., tools such as those described herein) can be extremely useful in simplifying the programmer's job of managing atomic triggers based parallelism.

To that end, in some embodiments, the systems described herein may provide the programmer with an aggregation operation (e.g., aggregate). This aggregation operation may allow the calling user thread to wait for the completion of the atomic task cascades generated by all of the atrigger accesses made after the last aggregation point or the beginning of execution of the user thread, whichever comes later. This interval between the current aggregation point and the last one (or the beginning of the user thread) may be referred to as an execution epoch of the user thread. In some embodiments, the use of the aggregation operation may allow programmers to code idioms in which the user thread spawns a complex activity in the form of one or more cascades of atomic tasks (initiated by accessing one or more atriggers in one or more atomic blocks), which comprise an epoch, and then waits for the activity to complete by transitioning the program state to a quiescent point, where there are no more outstanding (pending) triggered atomic tasks that are "enabled" to execute via accesses to atriggers done by already executed atomic tasks in the epoch. By supporting the concept of such epochs (together with their aggregation points), the systems herein may enable programmers to write programs that generate and utilize atrigger-based data-driven concurrency in phases, separated by steps that aggregate results from the previous phase, that perform some additional computation(s) to generate more work for the next phase, or that do both.

Note that since the aggregate operation is inherently un-isolated, it is meaningful to call this operation outside atomic blocks. In some embodiments, calling aggregate inside an atomic block may abort the block's execution, unless the current epoch has already ended, in which case, the operation will return immediately. In some embodiments, a call to aggregate inside an atomic task may return immediately without doing anything, since the task has not spawned any atomic tasks in the first place.

Abrupt Epoch Halts

In some embodiments, an epoch may generally form a complex computational activity that terminates when all the triggered tasks in the epoch complete execution. However, in some applications, the epoch may, in the middle of its execution (where there still exist triggered atomic tasks yet to be executed), transition the program state to a point where any further execution of atomic tasks in the epoch may be considered wasted work. In some embodiments, the programmer may be provided a tool to react to such situations by abruptly halting the epoch.

For example, in some embodiments, the programmer may be provided with a haltAndThrow operation that programmers can use to signal the runtime system, by throwing an EpochHaltException, that the current epoch needs to be halted immediately. In this case, the runtime system may ignore all the "pending" atomic tasks that have been scheduled for execution, and throw a special EpochHaltException to the call site of the corresponding aggregate method call. In such embodiments, throwing this exception to the aggregate method may be a signal to the programmer that the event that just took place was an epoch-wide event.

In some embodiments, the haltAndThrow method may take an exception object as a parameter that is wrapped in the EpochHaltException that it eventually throws. In such embodiments, the programmer may use this exception object to describe the circumstances under which the epoch was abruptly halted. This information may, in turn, be used by the user thread to perform appropriate steps to deal with the abrupt epoch halt.

In the following example, the AtomicTriggerMgmt class contains operations that may be used to effectively manage atomic tasks triggered by atriggers.

```
class AtomicTriggerMgmt {
    public static void aggregate( )
        throws EpochHaltException;
    public static void haltAndThrow(Exception e);
        throws EpochHaltException;
}
```

Note that the haltAndThrow method described herein may be called from within an atomic task, from within an atomic block, or outside of either, in various embodiments. If this method is called from inside an atomic task, the task may be committed before them EpochHaltException is thrown. An EpochHaltException thrown this way may be caught at the call site of the aggregate method of the user thread that started the epoch. If the haltAndThrow method is called from within an atomic block, the block may be committed before the exception is thrown. In all three cases, the exception may need to be caught by the user thread.

Note that a decision about whether to implement CDDP using the propagation of exceptions to the boundaries to atomic blocks may be a contentious one. For example, it may not always be clear whether it is best for the atomic block that generated the exception to commit or abort. Different embodiments may employ either or both options for different circumstances. Note, however, that exceptions thrown from atomic tasks (with the exception of the EpochHaltException described above) may be treated by the runtime system as uncaught exceptions, in some embodiments.

In various embodiments, the implementation of atomic blocks may be done using Transactional Memory (TM) runtimes or lock inferencing. In some embodiments, the scheduling and/or execution of atomic tasks may be performed using a work-stealing-based scheduler. In some such embodiments, each atomic task may be treated as a work item that is executed by some thread from a pool of worker threads that are completely controlled by the runtime system and that are transparent to the programmer.

In some embodiments, the techniques described above for implementing data-driven parallelism (e.g., those that include scheduling or deferring various spawned tasks within a task group) may be combined with techniques based on the use of atomic-blocks and/or transactional memory. In such embodiments, when data that triggers a new task (deferred or not) is written to from within a transaction, the corresponding new task may only be spawned when the transaction commits. In some such embodiments, if the same data object (e.g., one for which changes trigger the spawning of a new task) is written multiple times from within the same transaction, only one task may be spawned for the data object when the transaction commits, rather than separate tasks being spawned for each change to the data object.

In some embodiments that support the use of atriggers, the compiler may transform an atrigger into a wrapper object with special getter and setter methods, the calls to which replace the reads and writes of the atrigger in the compiled code. In addition to performing the actual data field reads and writes (which were replaced in the first place), the getter and setter methods may also implement the functionality of registering the corresponding trigger handlers for execution when the enclosing atomic block or task completes its execution. In such embodiments, the runtime system may maintain the list of all the atriggers that were accessed by each atomic task, and subsequently, when the task completes execution, the runtime may post all the appropriate trigger handlers for execution with the task scheduler.

In some embodiments that support the use of atriggers, the compiler may be responsible for creating the mapping between the atriggers and their handlers by analyzing the atrigger object or class fields, the corresponding @ATriggerHandlers, and the @ATriggerReadEvents and @ATriggerWriteEvents. In some embodiments, the compiler may maintain a table of atriggers and their corresponding handlers in the object files for the class. For example, in the context of the Java programming language, such a table may be added in the ClassFile structure (from the JVM specification), which may be consulted by the runtime system to trigger the right set of handlers when an atomic block or task that accesses atriggers completes execution.

In some embodiments, the aggregate operation may be implemented as a wait loop that waits on the current epoch to halt. In such embodiments, the termination detection logic may include logic for monitoring a per-user-thread "outstanding tasks-to-complete counter", which may be incremented whenever a new atomic tasks is triggered for execution by the runtime, and may be decremented when an atomic task completes execution. As previously noted, a scalable variant of this counter may be implemented using a scalable nonzero indicator, in some embodiments.

In some embodiments, the abrupt epoch halts functionality described herein may be implemented by the runtime system, e.g., by catching a EpochHaltException that was thrown from a call to haltAndThrow in an atomic task, and posting the exception object in the user thread's local space. In some embodiments, the exception may be relayed to the aggregate method call made by the user thread. The aggregate method, while it waits for the epoch to complete, may also regularly check to see if an EpochHaltException was thrown by an atomic task. If so, the aggregate method may re-throw the same exception object.

The atomic trigger abstractions that may, in some embodiments, be provided for use by the programmer may be further illustrated by way of the following example application. In this example, the application is a satisfiability (SAT) solver that uses atomic triggers and their corresponding handlers to process each variable assignment. More specifically, given an input Boolean formula, a SAT solver's job is to determine whether there exists a satisfying assignment to the variables appearing in the formula (e.g., whether there is an assignment to the variables that will evaluate the formula to true), and if so, what that variable assignment is. Satisfiability is an NP-complete problem, so a SAT solver task is an exhaustive search through the variable assignments. SAT solvers employ a wide range of heuristics and strategies to accelerate this search. However, there is no guarantee that a solver will find a solution to an input formula in a given amount of time. Typically, these solvers simply give up if they cannot find a satisfying variable assignment, or if they cannot determine whether the formula is unsatisfiable (in UNSAT).

In addition to the variable assignment heuristics, many state-of-the-art SAT solvers include a Boolean constraint propagation (BCP) component in their search. A BCP component may be configured to determine whether a variable assignment may result in an implied variable assignment. If so, it may make that implied assignment explicit, and may recursively apply the same computation on the implied variable assignments. For example, consider the following formula:

$$F=(x \text{ OR } y) \text{AND} (\text{NOT}(y) \text{ OR } z)$$

In this formula, OR represents a logical OR operation, AND represents a logical AND operation, and NOT represents the logical NOT. In this example, if the solver sets x=false, then y automatically becomes true. In this case, since y is true, z becomes true. This process of transitively inferring variable assignments from a single variable assignment is called the BCP.

In a little more detail, the SAT solver contains a mapping from variables to clauses in the formula in which these variables appear. Whenever a variable is assigned a value (possibly using some heuristic), the SAT solver peruses through the variable's clause set (i.e., the set of clauses in which it appears) and checks each clause to see if there is an implied variable assignment. If there is an implied variable assignment, the solver makes the assignment explicit, and processes the implied variable in a similar fashion.

Note that many (if not most) SAT solvers spend 80-90% of their execution time performing BCP. Hence, this looks like an ideal target for parallelization. In some embodiments, the parallelization strategy may begin with a sequential SAT solver. In the solver, the input formula's variables may be designated as atriggers and the method that processes a variable assignment (e.g., that peruses through the clause set of the variable looking for implied variable assignments) may be designated as the corresponding @ATrigger-WriteEvent handler. In some embodiments, the code that makes a variable assignment using the solver's heuristics may be enclosed within an atomic block. This is the code executed by the "master" thread, e.g., the only user thread in the application. This may serve as a launching pad for BCP activity that is run entirely by atriggers and their handlers. To boost parallelism, the solver's heuristics-based variable assignment logic may be modified to make multiple variable assignments at a time, which in turn may concurrently launch multiple handlers, each corresponding to a variable that was assigned a value, delivering parallelism from the get go.

In some embodiments, after making the variable assignments, the master thread may call aggregate and may wait for the BCP computation triggered by the heuristics-based variable assignments to complete. Note that the BCP computation may take care of all the implied variable assignments. In some embodiments, the master thread may continue with its heuristics-based variable assignment after aggregate returns. If it cannot make any more variable assignments, the solver may have found a satisfying assignment. If it determines that it has exhausted the search space, it has determined that the input formula is in UNSAT. Otherwise, if it runs out of time, it may abandon its search and return an UNDECIDED flag.

In some embodiments, if, during BCP, an atomic task determines that certain variable assignment choices were "bad" (e.g. if they lead to the formula evaluating to false), the task may halt the BCP process by calling haltAndThrow to indicate the issue to the master thread. The master thread may then be responsible for determining the combination of variable assignments that is problematic, constructing a "conflict clause" that guarantees that the combination will never manifest in future, backtracking the problematic assignments, and repeating the whole computation with a new set of heuristics-based variable assignments.

Figure 9:
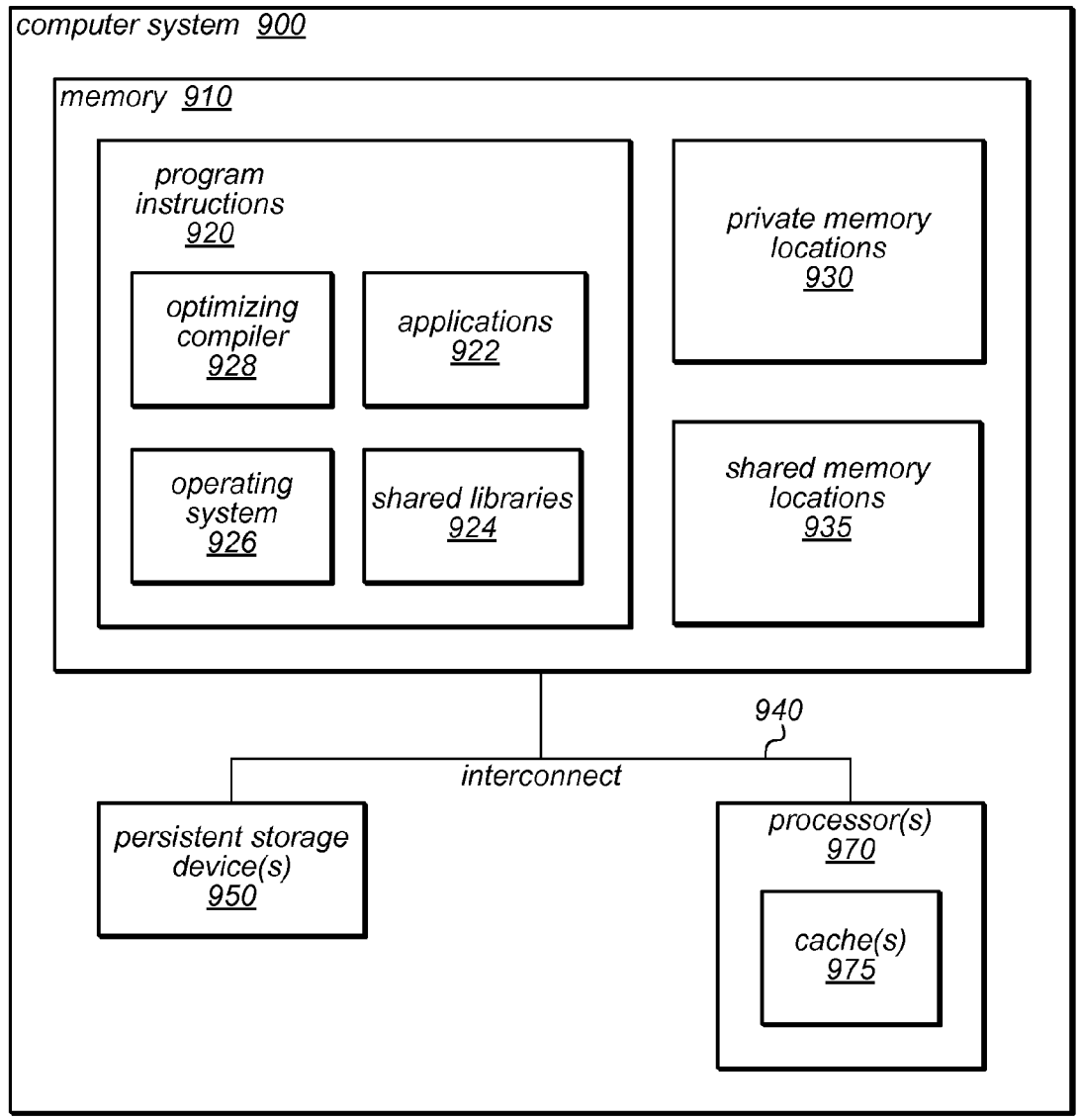
FIG. 9 is a block diagram illustrating a computing system configured to implement constrained data-driven parallelism, according to various embodiments.

Through the evaluations and explorations described herein (and others) the following lessons have been learned about the use of a constrained approach to data-driven parallelism (e.g., one that employs atriggers or other techniques to implement constrained data-driven parallelism), in various embodiments:

- Initial results suggest this covers a broad range of problems
    - Traditional problems expressed in a data-driven style
    - Incremental/self-adjusting versions of other problems
    - Some benefits are obtained purely from data-driven traversal order
- The use of two phases may be a sweet-spot for control over-scheduling
    - Avoids pathologically bad cases in many workloads
- Work done within a handler is often small and "local"
    - Fine-grained locking may be effective
    - HTM may be likely to be a good fit The techniques described herein for implementing constrained data-driven parallelism may be implemented on or by any of a variety of computing systems, in different embodiments. FIG. 9 illustrates a computing system 900 that is configured to implement constrained data-driven parallelism, according to various embodiments. The computer system 900 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for implementing constrained data-driven parallelism, as described herein, may be provided as a computer program product, or software, that may include a non-transitory, computer-readable storage medium having stored thereon instructions, which may be used to program a computer system 900 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 900 may include one or more processors 970; each may include multiple cores, any of which may be single or multi-threaded. For example, multiple processor cores may be included in a single processor chip (e.g., a single processor 970), and multiple processor chips may be included in computer system 900. Each of the processors 970 may include a cache or a hierarchy of caches 975, in various embodiments. For example, each processor chip 970 may include multiple L1 caches (e.g., one per processor core) and one or more other caches (which may be shared by the processor cores on a single processor). The computer system 900 may also include one or more persistent storage devices 950 (e.g. optical storage, magnetic storage, hard drive, tape drive, solid state memory, etc) and one or more system memories 910 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 9 (e.g., video cards, audio cards, additional network interfaces, peripheral devices, a network interface such as an ATM interface, an Ethernet interface, a Frame Relay interface, etc.)

The one or more processors 970, the storage device(s) 950, and the system memory 910 may be coupled to the system interconnect 940. One or more of the system memories 910 may contain program instructions 920. Program instructions 920 may be executable to implement one or more applications 922 (which may include application source code and/or executable application code that is well-suited to and/or configured for data-driven parallelism, as described herein), shared libraries 924, or operating systems 926. In some embodiments, program instructions 920 may include an optimizing compiler 928, which may be configured to apply one or more of the transformations and/or optimizations described herein to application or library code to produce code that is executable to implement constrained data-driven parallelism. In some embodiments, program instructions 920 may be executable to implement a contention manager (not shown). In some embodiments, program instructions 920 may also be configured to implement a transaction support library, which provides various methods for implementing atomic transactions (e.g., within shared libraries 924 or elsewhere within program instructions 920). In some embodiments, a transaction support library may include functionality to execute transactions according to various hardware and/or software transactional memory techniques. For example, in some embodiments, applications 922 may make calls into a transaction support library for beginning and ending (e.g., committing) transactions, and/or for performing one or more accesses to shared memory locations 935 (e.g., locations within a shared transactional memory space) from within transactions.

Program instructions 920 may be encoded in platform native binary, any interpreted language such as Java™ byte-code, or in any other language such as C/C++, the Java™ programming language, etc., or in any combination thereof. In various embodiments, optimizing compiler 928, applications 922, operating system 926, and/or shared libraries 924 may each be implemented in any of various programming languages or methods. For example, in one embodiment, optimizing compiler 928 and operating system 926 may be based on the Java programming language, while in another embodiments they may be written using the C or C++ programming languages. Similarly, applications 922 may be written using the Java programming language, C, C++, or another programming language, according to various embodiments. Moreover, in some embodiments, optimizing compiler 928, applications 922, operating system 926, and/shared libraries 924 may not be implemented using the same programming language. For example, applications 922 may be C++ based, while optimizing compiler 928 may be developed using C.

The program instructions 920 may include transactional memory support and/or other functions, operations, or procedures for implementing constrained data-driven parallelism, as described herein. Such support and functions may exist in one or more of the shared libraries 924, operating systems 926, or applications 922, in various embodiments. The system memory 910 may further comprise private memory locations 930 and/or shared memory locations 935 where data may be stored. For example, shared memory locations 935 may include locations in a shared transactional memory space, which may support and/or be accessed by transactions in a software transactional memory implementation, a hardware transactional memory implementation, and/or a hardware-software hybrid transactional memory implementation, in different embodiments. In some embodiments, shared memory locations 935 may store data or other shared resources that are accessible to multiple, concurrently executing threads, processes, or transactions, in various embodiments. In various embodiments, private memory locations 930 and/or shared memory locations 935 may store data representing a number or a list of tasks to be executed in a current phase, or a number or a list of tasks to be executed in a subsequent phase. In addition, the system memory 910 and/or any of the caches of processor(s) 970 may, at various times, store recorded values of local variables, counters, nonzero indicators, and/or various fields of the data structures that make up queues of tasks to be executed, as described herein, and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of triggers and/or handlers that support constrained data-driven parallelism, it should be noted that the techniques and mechanisms disclosed herein for implementing constrained data-driven parallelism may be applicable in other contexts in which triggers and/or handlers are constructed from different types of structures than those described in the examples herein. It is intended that the following claims be interpreted to embrace all such variations and modifications.

What is claimed:

1. A method, comprising:
performing, by a computer:
executing a given task in a data-driven computation, wherein said executing comprises spawning two or more other tasks in response to respective trigger conditions for the data-driven computation being met, wherein each trigger condition identifies a particular memory location and wherein the trigger condition is met in response to the particular memory location being modified;
for each of the spawned tasks: determining whether to schedule the spawned task for execution or defer execution of the spawned task;
creating a task group comprising:
the given task;
a subset of spawned tasks comprising spawned tasks scheduled for execution; and
another subset of spawned tasks comprising spawned tasks for which execution was deferred;
wherein said creating comprises executing an operation that blocks execution of a task that initiated execution of the given task until execution of all tasks that are added to the task group subsequent to adding the given task to the task group has been completed;
executing the subset of the spawned tasks;
executing, subsequent to completing said executing the subset of the spawned tasks, the other subset of the spawned tasks; and
beginning execution, subsequent to completing execution of the tasks that were added to the task group subsequent to adding the given task to the task group, of one or more tasks in another task group.

2. The method of claim 1, wherein said determining whether to schedule the spawned task for execution or defer execution of the spawned task is dependent on whether program instructions defining the spawned task specify that the spawned task should be deferred.

3. The method of claim 1, wherein said determining whether to schedule the spawned task for execution or defer execution of the spawned task is dependent on a system-wide, application-specific, task-specific, or user-specified policy or parameter value.

4. The method of claim 1, further comprising:
subsequent to completing execution of all of the tasks that were added to the task group, beginning execution of one or more tasks in another task group, wherein the tasks in the other task group have a lower priority than the tasks in the task group.

5. The method of claim 1, wherein said executing the subset of spawned tasks comprises executing the subset of spawned tasks during a current execution phase, and wherein said executing the other subset of spawned tasks comprises executing the other subset of spawned tasks during a subsequent execution phase.

6. The method of claim 1, wherein said executing the subset of spawned tasks comprises executing the subset of spawned tasks during a current execution phase, and wherein said executing the other subset of spawned tasks comprises executing at least two of the tasks in the other subset of spawned tasks during different ones of a plurality of subsequent execution phases.

7. The method of claim 1, further comprising:
determining whether execution of the tasks in the subset of spawned tasks or the other subset of spawned tasks has been completed dependent on a value of a respective nonzero indicator that is associated with the subset of spawned tasks or the other subset of spawned tasks;
wherein the value of the nonzero indicator indicates whether the number of tasks in the subset of spawned tasks or the other subset of spawned tasks that have not completed execution is zero or nonzero.

8. The method of claim 1, wherein each of the tasks in the subset of spawned tasks has a higher priority than any of the tasks in the other subset of spawned tasks.

9. The method of claim 1, further comprising, for each of the spawned tasks:
placing the spawned task in a pool of tasks to be executed or in a pool of tasks for which execution is deferred, dependent on said determining whether to schedule the spawned task for execution or defer execution of the spawned task.

10. The method of claim 9, wherein at least one of said executing the subset of spawned tasks or said executing the other subset of spawned tasks is performed by a thread that placed the spawned tasks in the pools and by one or more other threads according to a work-stealing policy.

11. The method of claim 1, wherein said spawning two or more other tasks comprises spawning a task that corresponds to an iteration of a loop construct in program code.

12. A system, comprising:
one or more processor cores; and
a memory coupled to the one or more processor cores and storing program instructions that when executed on the one or more processor cores cause the one or more processor cores to perform:
executing a given task in a data-driven computation, wherein said executing comprises spawning one or more other tasks in response to one or more respective trigger conditions for the data-driven computation being met, wherein each trigger condition identifies a particular memory location and wherein the trigger condition is met in response to the particular memory location being modified;
for each of the spawned tasks:
determining whether to schedule the spawned task for execution or defer execution of the spawned task;
placing the spawned task in a pool of tasks to be executed or in a pool of tasks for which execution is deferred, dependent on said determining whether to schedule the spawned task for execution or defer execution of the spawned task;
in response to determining that at least one of the spawned tasks is to be scheduled for execution: executing a subset of the spawned tasks, wherein the subset comprises all of the spawned tasks that were scheduled for execution;
in response to determining that execution of at least one of the spawned tasks is to be deferred: executing, subsequent to completing said executing the subset of the spawned tasks, another subset of the spawned tasks, wherein the other subset comprises one or more spawned tasks for which execution was deferred;
wherein at least one of said executing the subset of spawned tasks or said executing the other subset of spawned tasks is performed by a thread that placed the spawned tasks in the pools and by one or more other threads according to a work-stealing policy.

13. The system of claim 12, wherein when executed on the one or more processor cores, the program instructions further cause the one or more processor cores to perform, for each of the spawned tasks, adding the spawned task to a task group that comprises the given task, wherein the task group comprises the subset of spawned tasks and the other subset of spawned tasks.

14. The system of claim 13, wherein when executed on the one or more processor cores, the program instructions further cause the one or more processor cores to perform:
subsequent to completing execution of all of the tasks that were added to the task group, beginning execution of one or more tasks in another task group.

15. The system of claim 12, wherein said executing the subset of spawned tasks comprises executing the subset of spawned tasks during a current execution phase, and wherein said executing the other subset of spawned tasks comprises executing the other subset of spawned tasks during a subsequent execution phase.

16. A non-transitory, computer-readable storage medium storing program instructions that when executed on one or more computers cause the one or more computers to perform:
executing a given task in a data-driven computation, wherein said executing comprises spawning one or more other tasks in response to one or more respective trigger conditions for the data-driven computation being met, wherein each trigger condition identifies a particular memory location and wherein the trigger condition is met in response to the particular memory location being modified;
for each of the spawned tasks: determining whether to schedule the spawned task for execution or defer execution of the spawned task;
creating a task group comprising:
the given task;
a subset of spawned tasks comprising spawned tasks scheduled for execution; and
another subset of spawned tasks comprising spawned tasks for which execution was deferred;
wherein said creating comprises executing an operation that blocks execution of a task that initiated execution of the given task until execution of all tasks that are added to the task group subsequent to adding the given task to the task group has been completed;
executing in response to determining that at least one of the spawned tasks is to be scheduled for execution, the subset of the spawned tasks;
executing, in response to determining that execution of at least one of the spawned tasks is to be deferred and subsequent to completing said executing the subset of the spawned tasks, the other subset of the spawned tasks; and
beginning execution, subsequent to completing execution of the tasks that were added to the task group subsequent to adding the given task to the task group, of one or more tasks in another task group.

17. The non-transitory, computer-readable storage medium of claim 16,
wherein said executing the subset of spawned tasks comprises executing the subset of spawned tasks during a current execution phase for the task group; and
wherein said executing the other subset of spawned tasks comprises executing the other subset of spawned tasks during a subsequent execution phase for the task group.

\* \* \* \* \*

UNITED STATES PATENT AND TRADEMARK OFFICE
CERTIFICATE OF CORRECTION

PATENT NO. : 9,804,888 B2  
APPLICATION NO. : 14/047749  
DATED : October 31, 2017  
INVENTOR(S) : Marathe et al.

Page 1 of 1

It is certified that error appears in the above-identified patent and that said Letters Patent is hereby corrected as shown below:

On the Title Page

On page 2, Column 2, under Other Publications, Line 7, delete "effcient" and insert -- efficient --, therefor.

On page 2, Column 2, under Other Publications, Line 23, delete "Workhop" and insert -- Workshop --, therefor.

In the Specification

In Column 6, Line 8, after "modified)" insert -- . --.

In Column 6, Line 32, after "pieces" insert -- . --.

In Column 6, Line 37, after "execution)" insert -- . --.

In Column 6, Line 39, after "time" insert -- . --.

In Column 9, Line 64, after "remaining" insert -- . --.

In Column 23, Line 28, delete "ton" and insert -- to --, therefor.

In Column 29, Line 25, after "may" insert -- be --.

Signed and Sealed this  
Twenty-sixth Day of June, 2018

Andrei Iancu  
*Director of the United States Patent and Trademark Office*